United States Patent
Jones et al.

(10) Patent No.: US 6,879,600 B1
(45) Date of Patent: Apr. 12, 2005

(54) METHOD AND SYSTEM FOR INTERSYSTEM WIRELESS COMMUNICATION SESSION ARBITRATION

(75) Inventors: Bryce A. Jones, Overland Park, KS (US); Jason Delker, Olathe, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 0 days.

(21) Appl. No.: 10/233,247

(22) Filed: Aug. 30, 2002

Related U.S. Application Data

(63) Continuation-in-part of application No. 10/161,313, filed on Jun. 3, 2002.

(51) Int. Cl.$^7$ ............................... H04J 3/22; H04Q 7/00
(52) U.S. Cl. ....................................... 370/466; 370/332
(58) Field of Search .................................. 370/310, 328, 370/331–332, 389, 392, 437, 465, 466, 313, 314, 329, 333, 340–341, 352–357, 360, 401, 464–467; 455/436–440

(56) References Cited

U.S. PATENT DOCUMENTS

| | | | |
|---|---|---|---|
| 5,737,703 A | * | 4/1998 | Byrne .......................... 455/442 |
| 6,438,117 B1 | * | 8/2002 | Grilli et al. .................. 370/331 |
| 6,680,923 B1 | | 1/2004 | Leon ........................... 370/328 |
| 2001/0036830 A1 | * | 11/2001 | Wu et al. ..................... 455/436 |
| 2003/0091021 A1 | * | 5/2003 | Trossen et al. .............. 370/349 |

OTHER PUBLICATIONS

*GPC–5000 "1X Dual Band & Wireless LAN"*, http://www.gtran.co.kr/products/card/GPC5000.htm, printed on Apr. 26, 2002.
*PRISM 2.5, 11MBPS*, http://www.intersil.com/design/prism/ser–p25–11mbps.asp, printed on Apr. 26, 2002.
*Intersil's PRISM Technology Powers New Wireless IP Telephony Devices from Symbol Technologies*, http://www.bbwexchange.com/news/intersil102301.htm, printed on Apr. 25, 2002.

(Continued)

*Primary Examiner*—Chi Pham
*Assistant Examiner*—Ronald Abelson

(57) ABSTRACT

A mobile station provides arbitration and hand-off between two or more differently formatted computer and/or telecommunication networks. To facilitate the mobile station arbitration and hand-off, the mobile station operates at a given location in which it can communicate according to a first protocol via a first-access system and at which it can communicate according to a second protocol via a second-access system. At the given location, the mobile station arbitrates between communicating real-time media according to the first protocol via the first-access system and communicating real-time media according to the second protocol over the first protocol via the second-access system.

To carry out the arbitration, mobile station may be provisioned with one or more arbitration policies. Based on these arbitration policies, the mobile station commits resources to carry on a communication session via a selected access system. When the arbitration policies comprise a preferred-network attribute, such as a preferred-network threshold, the mobile station arbitration may be performed by a comparison function. This comparison function may include ascertaining a preferred-network metric and communicating voice content according to the first protocol via the first-access system when the preferred-network metric surpasses the preferred-network threshold or communicating voice content according to the second protocol over the first protocol via the second-access system when the preferred-network metric does not surpass the preferred-network threshold.

40 Claims, 8 Drawing Sheets

OTHER PUBLICATIONS

*Intersil's PRISM Technology On Board New GTRAN Wireless Dual–Mode 802.11/CDMA Wireless Modem Card*, http://www.gtranwireless.com/newsevents/pressreleases_20020422.htm, printed on Apr. 26, 2002.

*GTRAN Wireless demonstrates the DotSurfer WAN+WLAN combo PC cards and CDMA 2000 1X PC cards at CTIA Wireless 2002*, http://www.gtranwireless.com/newsevents/pressreleases_20020318_DotSurferDemo.htm, printed on Aug. 30, 2002.

Blackwell, Gerry *Wireless Anywhere—Even Miles from an Access Pont?*, http://www.80211–planet.com/colums/article/0,4000,1781_1013361,00.html, printed on Aug. 30, 2002.

Choon Chan, Mun, and Woo, Y.C. Thomas, *Next–Generation Wireless Data Services: Architeture and Experience*, IEEE Personal Communications, Feb. 1999, pp. 20–33.

* cited by examiner

| Initial Communication Session | Preferred-Network Metric | Preferred-Network Threshold | Mobile Station Resources Set to Communicate in CDMA Network Using EVRC | Mobile Station Resources Set to Communicate in 802.11 Network Using 802.11-framed-EVRC |
|---|---|---|---|---|
| Ongoing session in CDMA-format network using EVRC. | Transmission rate of CDMA network | CDMA network transmission-rate threshold | If the transmission rate of the CDMA network surpasses (e.g. is greater than) the CDMA network transmission-rate threshold. | If the transmission rate of the CDMA network does not surpass (e.g. is less than) the CDMA network transmission-rate threshold, but may require processing another comparison function. |
| Ongoing session in CDMA-format network using EVRC. | Signal-strength of the CDMA network | CDMA network signal-strength threshold | If the signal-strength of the CDMA network surpasses (e.g. is greater than) the CDMA signal-strength threshold. | If the signal-strength of the CDMA network does not surpass (e.g. is less than) the CDMA network signal-strength threshold, but may require processing another comparison function. |
| Ongoing session in CDMA-format network using EVRC. | Security mechanisms of CDMA network | CDMA security-mechanism-threshold | If the security mechanisms deployed in the CDMA network surpasses (e.g., provide minimum allowable security) the CDMA network security-mechanism threshold. | If the security mechanisms of deployed in the CDMA network do not surpass (e.g., do not provide minimal allowable security) the CDMA network security-mechanism thresholds, but may require processing another comparison function. |
| Ongoing session in CDMA-format network using EVRC. | Traffic volume occurring on the CDMA network | CDMA network load threshold | If the traffic volume of the CDMA network surpasses (e.g. is greater than) the CDMA network load-threshold. | If the traffic-volume of the CDMA network does not surpass (e.g. is less than) the CDMA network load threshold, but may require processing another comparison function. |
| Ongoing session in CDMA-format network using EVRC. | Cost-of-service (e.g., the cost of units of usage in terms of money) in the 802.11 network | 802.11 network cost-of service threshold | If the cost-of-service of the 802.11 network surpasses (e.g. is greater than) the 802.11 network cost-of-service threshold. | If the cost-of-service in the 802.11 network does not surpass (e.g. is less than) the 802.11 network cost-of-service threshold, but may require processing another comparison function. |
| Ongoing session in CDMA-format network using EVRC. | Transmission rate of 802.11 network | 802.11 network transmission-rate threshold | If the transmission rate of the 802.11 network surpasses (e.g. is less than) the 802.11 network transmission-rate threshold. | If the transmission rate of the 802.11 network does not surpass (e.g. is greater than) the 802.11 network transmission-rate threshold, but may require processing another comparison function. |
| Ongoing session in CDMA-format network using EVRC. | Signal-strength of the 802.11 network | 802.11 network signal-strength threshold | If the signal-strength of the 802.11 network surpasses (e.g. is less than) the 802.11 signal-strength threshold. | If the signal-strength of the 802.11 network does not surpass (e.g. is greater than) the 802.11 network signal-strength threshold, but may require processing another comparison function. |
| Ongoing session in CDMA-format network using EVRC. | Security mechanisms of 802.11 network | 802.11 security-mechanism-threshold | If the security mechanisms deployed in the 802.11 network surpasses (e.g., provide minimum allowable security) the 802.11 network security-mechanism threshold. | If the security mechanisms of deployed in the 802.11 network do not surpass (e.g., do not provide minimal allowable security) the 802.11 network security-mechanism thresholds, but may require processing another comparison function. |
| Ongoing session in CDMA-format network using EVRC. | Traffic volume occurring on the 802.11 network | 802.11 network load threshold | If the traffic volume of the 802.11 network surpasses (e.g. is less than) the 802.11 network load-threshold. | If the traffic-volume of the 802.11 network does not surpass (e.g. is greater than) the 802.11 network load threshold, but may require processing another comparison function. |

FIGURE 6
Table 1

| Initial Communication Session | Preferred-Network Metric | Preferred-Network Threshold | Mobile Station Resources Set to Communicate in CDMA Network Using EVRC |
|---|---|---|---|
| Ongoing session in 802.11-format network using 802.11-framed-EVRC. | Cost-of-service (e.g., the cost of units of usage in terms of money) in the CDMA network | CDMA network cost-of-service threshold | If the cost-of-service in the CDMA network does not surpass (e.g., is greater than) the CDMA network cost-of-service threshold, but may require processing another comparison function. |
| Ongoing session in 802.11-format network using 802.11-framed-EVRC. | Transmission rate of CDMA network | CDMA network transmission-rate threshold | If the transmission rate of the CDMA network does not surpass (e.g., is less than) the CDMA network transmission-rate threshold, but may require processing another comparison function. |
| Ongoing session in 802.11-format network using 802.11-framed-EVRC. | Signal-strength of the CDMA network | CDMA network signal-strength threshold | If the signal-strength of the CDMA network does not surpass (e.g., is greater than) the CDMA network signal-strength threshold, but may require processing another comparison function. |
| Ongoing session in 802.11-format network using 802.11-framed-EVRC. | Security mechanisms of CDMA network | CDMA security-mechanism-threshold | If the security mechanisms of deployed in the CDMA network surpass (e.g., provide minimal allowable security) the CDMA network security-mechanism thresholds, but may require processing another comparison function. |
| Ongoing session in 802.11-format network using 802.11-framed-EVRC. | Traffic volume occurring on the CDMA network | CDMA network load threshold | If the traffic-volume of the CDMA network does not surpass (e.g., is greater than) the CDMA network load threshold, but may require processing another comparison function. |
| Ongoing session in 802.11-format network using 802.11-framed-EVRC. | Cost-of-service (e.g., the cost of units of usage in terms of money) in the 802.11 network | 802.11 network cost-of-service threshold | If the cost-of-service in the 802.11 network does not surpass (e.g., is greater than) the 802.11 network cost-of-service threshold, but may require processing another comparison function. |
| Ongoing session in 802.11-format network using 802.11-framed-EVRC. | Transmission rate of 802.11 network | 802.11 network transmission-rate threshold | If the transmission rate of the 802.11 network does not surpass (e.g., is less than) the 802.11 network transmission-rate threshold, but may require processing another comparison function. |
| Ongoing session in 802.11-format network using 802.11-framed-EVRC. | Signal-strength of the 802.11 network | 802.11 network signal-strength threshold | If the signal-strength of the 802.11 network does not surpass (e.g., is less than) the 802.11 network signal-strength threshold, but may require processing another comparison function. |
| Ongoing session in 802.11-format network using 802.11-framed-EVRC. | Security mechanisms of 802.11 network | 802.11 security-mechanism-threshold | If the security mechanisms of deployed in the 802.11 network do not surpass (e.g., do not provide minimal allowable security) the 802.11 network security-mechanism thresholds, but may require processing another comparison function. |
| Ongoing session in 802.11-format network using 802.11-framed-EVRC. | Traffic volume occurring on the 802.11 network | 802.11 network load threshold | If the traffic-volume of the 802.11 network does not surpass (e.g., is greater than) the 802.11 network load threshold, but may require processing another comparison function. |

FIGURE 7
Table 2

| Initial Communication Session | Preferred-Network Metric | Preferred-Network Threshold | Mobile Station Resources Set to Communicate in CDMA Network Using EVRC |
|---|---|---|---|
| Ongoing session in CDMA-format network using EVRC. | Relative-transmission rate of CDMA network to 802.11 network | Relative-network transmission-rate threshold (CDMA transmission rate : 802.11 transmission rate >1) | If the relative transmission rate metric surpasses (e.g. is greater than) the relative-transmission-rate threshold. |
| Ongoing session in CDMA-format network using EVRC. | Relative-cost-of-service (e.g., the cost of units of usage in terms of money in the CDMA network as compared to the cost of units of usage in the 802.11 network) | Relative-cost-of service threshold (CDMA cost : 802.11 cost >1) | If the relative cost-of-service metric surpasses (e.g. is greater than) the relative cost-of-service threshold. |
| Ongoing session in CDMA-format network using EVRC. | Relative-security mechanisms | Relative-security-mechanism-threshold (CDMA network's security mechanisms provide greater security than the 802.11 network) | If the relative-security-mechanism metric surpasses (e.g., CDMA network security mechanisms are greater than the 802.11 network) the relative-security-mechanism threshold. |
| Ongoing session in CDMA-format network using EVRC. | Relative-traffic-load between the CDMA and 802.11 networks | Load-balance threshold | If the relative-traffic-load surpasses (e.g. the CDMA load is greater than the 802.11 load) the load-balance threshold. |
| Ongoing session in 802.11-format network using 802.11-framed-EVRC. | Relative-cost-of-service (e.g., the cost of units of usage in terms of money in the CDMA network as compared to the cost of units of usage in the 802.11 network) | Relative-cost-of service threshold (CDMA cost : 802.11 cost >1) | If the relative cost-of-service metric surpasses (e.g. is greater than) the relative cost-of-service threshold. |
| Ongoing session in 802.11-format network using 802.11-framed-EVRC. | Relative-transmission rate of CDMA network to 802.11 network | Relative-network transmission-rate threshold (CDMA transmission rate : 802.11 transmission rate >1) | If the relative transmission rate metric surpasses (e.g. is greater than) the relative-transmission-rate threshold. |
| Ongoing session in 802.11-format network using 802.11-framed-EVRC. | Relative-signal-strength between the CDMA network and the 802.11 network. | Relative-signal-strength threshold | If the relative-signal-strength metric does not surpass (e.g. is greater than) relative-signal-strength threshold. |
| Ongoing session in 802.11-format network using 802.11-framed-EVRC. | Relative-traffic-load between the CDMA and 802.11 networks | Load-balance threshold | If the relative-traffic-load surpasses (e.g. the CDMA load is greater than the 802.11 load) the load-balance threshold. |

FIGURE 8
Table 3

METHOD AND SYSTEM FOR INTERSYSTEM WIRELESS COMMUNICATION SESSION ARBITRATION

RELATED APPLICATIONS

The present application is related to and claims priority to U.S. patent application Ser. No. 10/161,313, filed Jun. 3, 2002, entitled "Method And System For Intersystem Wireless Communication Session Hand-Off," which is assigned to the same assignee as the present application, and which is fully incorporated herein by reference.

BACKGROUND

1. Field of the Invention

The present invention relates in general to telecommunications networks, and more particularly, to arbitrating between communicating voice content via one access system using one type protocol and communicating voice content in another access system using a second protocol. This invention is particularly useful for handing off voice communication sessions from a mobile station operating in a public wireless network to the same mobile station operating in a private wireless system, after the mobile station registers in the private wireless network, and vice versa.

2. Description of Related Art

Public wireless telecommunication networks have been developed using a model that is similar to traditional wireline telecommunication networks. Traditional wireline Telecommunications networks typically carry "signals," as well as the voice or data comprising the conversation between the calling party and the called party. These signals monitor the status of the lines, indicate the arrival of incoming calls, and carry the information needed to route the voice or other data through the network. At one time, these signals were inband, i.e., the signals were transmitted through the same circuits as used for voice transmission. Most circuit-switched telecommunications networks, however, now use out-of-band signaling, i.e., the signals are transmitted over a signaling network separate from the circuit-switched network that carries voice and data. Thus, signals carried on the separate signaling network are used to control the switches in the circuit-switched network to set up and tear down the circuit between the calling party and called party.

In a typical public wireless network, switching is performed by one or more mobile switching centers (MSCs). Each MSC typically controls one or more base stations or base transceiver stations (BTSs), sometimes via one or more base station controllers (BSCs). Each BTS provides a wireless coverage area within which mobile stations can communicate with the BTS over an air interface. The mobile stations can be cellular or PCS telephones, personal digital assistants (PDAs), and/or other devices. Different formats may be used for communicating over this wireless interface. At present, the most commonly used formats in the United States are Advanced Mobile Phone Service (AMPS), Time Division Multiple Access (TDMA), Global System for Mobile Communications (GSM), and Code Division Multiple Access (CDMA). In addition, newer format networks, such as Universal Mobile Telecommunications Service ("UMTS"), Wide-band CDMA ("WCDMA"), CDMA2000, and Generic Packet Radio Services ("GPRS"), are presently being developed and deployed.

In addition to public wireline and wireless networks, businesses and other organizations (collectively referred to herein as "enterprises") have been using private telecommunications networks for many years. Such networks are "private" in that the networks' coverage areas are more geographically limited, and typically, but not necessarily, subscription to the networks is limited to a select group of subscribers. For example, many enterprises have used private wireline switching systems, such as private branch exchanges (PBXs), to switch calls to and from telephones in the enterprise's office area. Such private telecommunications networks advantageously allow an enterprise greater control over its telecommunications system and enable the enterprise to customize the telecommunications it provides to its subscribers.

More recently, private telecommunications networks have also been provided with wireless capability. In particular, there have been developed various wireless office telephone systems ("WOTS") that provide for wireless communication in a, typically, limited geographic area, such as a building or campus. See, e.g., Lawrence Hart, et al., "Cellular and PCS: The Big Picture," p.183–232 (1997). However, many such WOTS systems require specialized telephones. Consequently, a standard cellular or PCS telephone that can be used in a public wireless network might not work in a given WOTS system. With many people routinely carrying a cellular or PCS telephone, requiring a different telephone to be used at work is a substantial inconvenience.

To overcome this disadvantage, some wireless office systems have been developed in accordance with the TIA's IS-94 specifications. The IS-94 specifications allow the same mobile stations to be used in both private and public wireless networks. However, IS-94 is not designed to hand-off calls between the private and public wireless networks. The lack of hand-off capability is a significant drawback. In particular, if a user moves out of the limited coverage area of the wireless office system during the course of a call, the call may be dropped. Alternatively, if the user during the course of a communication session moves into the coverage area of the private wireless network and a hand-off is not effectuated, the public wireless network may not realize savings of network resources that may have occurred had the communication session been handed-off.

In addition to the WOTS systems, recent advances in telecommunication services served over local area network, such as Voice-over-Packet-Data network communications, have provided the impetus for delivering wireless telecommunication services over local area networks. Accordingly, support for wireless telecommunications services over local area networks is approaching near necessity for many enterprises. And the need for such services is rapidly growing, not just for enterprises, but also for individuals for personal and business use in the home or home office, respectively. This need may be satisfied by a wireless local area network based on the Bluetooth specification, which is designed to serve telecommunication services to mobile stations operating within its coverage area. The Bluetooth specification provides that Bluetooth-technology devices, such as PDAs and/or cell telephones, may quickly and reliably exchange data with other Bluetooth technology devices, as well as provide local wireless connectivity with the wireless local area network element, such as desktop and docked notebook computers. Like the WOTS specification, the Bluetooth specification is not designed to hand-off communications between public and private wireless networks.

In an effort to standardize continuity and integrity of telecommunications in wireless local area networks, the IEEE promulgated the IEEE 802.11 standards to define the communication protocols between mobile stations, and network access points that bridge mobile stations to a local area network. One major advantage of using a wireless local area network that conforms to the IEEE 802.11 standard is the ability to use freely-available, unlicensed spectrum, including the Industrial, Scientific, and Medical (ISM) bands. Another advantage provided by the 802.11 set of standards is the specified support for the 1-Mps, 2-Mps, and the recently added 5.5-Mps and 11-Mps, 36-Mps, 48-Mps, and 54-Mps transmission speeds.

Some wireless office systems, however, have some limited ability to allow users to move between the private and public cellular networks during the course of an ongoing communication session. An example is the ROAMEO in-building wireless telephone system that is sold by AG Communication Systems, a subsidiary of Lucent Technologies. The ROAMEO wireless office system is a digital wireless office phone system that is provided as an adjunct to a company's existing PBX, Centrex, or key system. The ROAMEO system integrates a wireless handset, such as a TDMA-based cellular or PCS handset supplied by a TDMA-based wireless-network provider, with an existing in-house phone system that uses IS-136 TDMA digital technology for communication with the wireless handset. When registered, ROAMEO system allows the wireless handset to act as a cordless extension of subscribers' desk phones. The system allows registered subscribers' to make and receive calls and utilize all the features of their office phones with the wireless handset in the coverage area of a building or a campus environment. Subscribers can use the same handset in the public cellular or PCS network to receive calls destined for their office phones.

If a user originates a communication session in the public wireless network, and then moves into the building served by the ROAMEO system during the course of the communication session, the session will continue using the public wireless network provided that the signal from the public wireless network is able to penetrate into the building. Once the communication session is ended or dropped, the telephone is automatically registered on the ROAMEO system. Thereafter, the ROAMEO system automatically directs incoming office calls to both the desk phone and the wireless handset, simultaneously. However, if a communication session is originated within the coverage area of the ROAMEO system, it may be dropped if the telephone leaves the ROAMEO coverage area.

Widergen, et al., U.S. Pat. No. 5,890,064 discloses a wireless office system that is said to be integrated into both a private telephony network and a public cellular system. Certain of the disclosed embodiments are said to support handover of ongoing communication session between cells of the wireless office system and the public cellular system. Analogous to the public wireless network, Widergen's wireless office system includes a wireless office gateway, and a radio access network to provide wireless communications to corporate mobile terminal, which is part of a corporate group of terminals of the private telephony network.

A disadvantage with this configuration, however, is that the wireless office system "is implemented as a private wireless system that operates according to the same standard as the public cellular system." See Widergen, et al., ln.1 col. 4. While such a system allows the subscriber to use the same mobile station in both the public wireless system and the wireless office system, it may be advantageous for subscribers to have one or more mobile stations that use different standards. Differing standards may take advantage of different range and power capacities for both the mobile station and subscribing networks, which may reduce or eliminate waste of network resources, and prevent over design of both types of networks. Widergen's technique of using the public wireless network elements to control the transmission of communication services in both the public and private wireless network does not facilitate application of different standards, either using a single mobile station or multiple stations.

SUMMARY

A first aspect of the present invention is directed to a method and system for mobile station arbitration between two or more computer and/or telecommunication networks. To facilitate the mobile station arbitration, the mobile station operates at a given location at which it can communicate according to a first protocol via a first-access system and at which it can communicate according to a second protocol via a second-access system. At the given location, the mobile station arbitrates between communicating voice content according to the first protocol via the first-access system and communicating voice content according to the second protocol over the first protocol via the second-access system.

To carry out the arbitration, the mobile station may be provisioned with one or more arbitration policies. These arbitration policies may include class-of-service attributes, quality-of-service attributes, preferred-network attributes and/or other attributes. Based on the arbitration policies, the mobile station commits its resources to carry on a communication session via a selected access system.

When the arbitration policies comprise a preferred-network attribute, which may be a preferred-network threshold such as a cost-of service threshold for using first access system, mobile station arbitration may be performed by a comparison function. This comparison function may be preformed by ascertaining a preferred-network metric, and communicating voice content according to the first protocol via the first-access system when the preferred-network metric surpasses the preferred-network threshold. On the other hand, the comparison function may be carried out by, again, ascertaining a preferred-network metric and communicating voice content according to the second protocol over the first protocol via the second-access system when the preferred-network metric does not surpass the preferred-network threshold.

In another alternative, the comparison function may involve comparing the network attributes of the first-access system with the second-access system, and allocating the mobile station resources to carry a communication session via either or both of the access systems. In such case, the mobile station may be provisioned with a preferred-network threshold. And the comparison function may be preformed by (i) ascertaining a first-preferred-network metric from the first-access system, (ii) ascertaining a second-preferred-network metric from the second-access system, (iii) comparing the first-preferred-network metric to the second-preferred-network metric to produce a relative-preferred-network metric, (iv) communicating voice content according to the first protocol via the first-access system when the relative-preferred-network metric surpasses the preferred-network threshold, and/or (v) communicating voice content according to the second over the first protocol via the second-access system when the relative-preferred-network metric does not surpass the preferred-network threshold.

A second aspect of the present invention is directed to a method and system for mobile station arbitration between two or more computer and/or telecommunication networks for hand-off of an ongoing communication. In one instance, the mobile station communicates voice content according to the first-protocol in a coverage area of the first-access system. During the ongoing communication, the mobile station moves to a given location at which it can communicate according to a first protocol via a first-access system and at which it can communicate according to a second protocol via a second-access system. After determining that it has moved to the given location, the mobile station arbitrates between communicating voice content according to the first protocol via the first-access system and communicating voice content according to the second protocol over the first protocol via the second-access system. If, during the course of the ongoing communication, the mobile station leaves or moves out of the given location, the mobile station may cease arbitration or arbitrate to an alternate network. The mobile station then carries on the ongoing communication according to the protocol of the access system that the mobile station moved to.

In another instance, the mobile station communicates voice content according to the second protocol or the second protocol over the first protocol in a coverage area of the second-access system. During the ongoing communication, the mobile station moves to a given location at which it can communicate according to a first protocol via a first-access system and at which it can communicate according to a second protocol via a second-access system. After determining that it has moved to the given location; the mobile station carries out its arbitration. If, during the course of the ongoing communication, the mobile station leaves or moves out of the given location, the mobile station may cease arbitration or arbitrate to an alternate network. The mobile station then carries on the ongoing communication according to the protocol of the access system that the mobile station moved to.

Communicating an ongoing communication session according to a second protocol over a first protocol may include encapsulating first-protocol encoded and/or encapsulated voice content in headers defined by the second protocol. By way of example, when engaging in an ongoing communication session via CDMA-format public wireless network, the mobile station may send and receive voice content encoded according to the Enhanced Variable Rate Codec (EVRC) or GSM Adaptive Multi-Rate standards. When communicating in an IEEE 802.11-format WLAN, the mobile station may send and receive the ongoing communication session's EVRC-encoded voice content encapsulated in IEEE 802.11 frames. Thus, the mobile station and elements in the 802.11-format WLAN may exchange the 802.11-framed-EVRC-encoded voice content to continue the ongoing communication session, after arbitration commits the mobile station's resources to communicate in the WLAN.

An advantage of using the second protocol over a first protocol is the ability to reduce the complexity of the mobile station. For instance, the mobile station may contain at least two communication modes for handing off ongoing communication sessions. In one of the communication modes, the mobile station may operate according to a protocol of a public wireless network. In another of the communication modes, the mobile station may operate according to a protocol of the private wireless network. In each of these modes, the mobile station may require separate components to carry on a communication session. However, by using another communication mode, namely the public wireless network protocol over the private wireless network protocol mode, the mobile station may still operate in the private wireless network. This mode also allows the mobile station to advantageously use the same encoder/decoder (vocoder) in the public wireless network and the private wireless network, which may reduce the mobile station's complexity, and number of components.

Accordingly, the present invention can conveniently take advantage of the higher data rates, the lower cost, and the superior building coverage of IEEE 802.11 wireless local area networks (WLAN), as compared with CDMA and other public wireless networks. For instance, the invention can obviate the need for CDMA radio equipment in buildings, and other campus areas. Further, the lower cost may be realized by utilizing the WLAN configuration because of no license fees or license auctions necessary for utilizing the frequency spectrum represented by the 802.11 implementation. Alternately, the public wireless network and the private wireless network may be co-located, integral to, and/or integrated into the same equipment enabling subscribers to benefit from reduced service costs, reduced capital equipment costs resulting from subscribing/leasing rather than owning, and eliminating or reducing the cost of obsolescence.

These as well as other aspects and advantages will become apparent to those of ordinary skill in the art by reading the following detailed description with appropriate reference to the accompanying drawings.

BRIEF DESCRIPTION OF THE DRAWINGS

Presently preferred embodiments of the invention are described below in conjunction with the appended figures, wherein like reference numerals refer to like elements in the various figures, and wherein:

FIG. 6 is a first table illustrating a non-exhaustive list of instances for accomplishing mobile station arbitration and voice session hand-off in accordance with one of the exemplary embodiments;

FIG. 7 is a second table illustrating a non-exhaustive list of instances for accomplishing mobile station arbitration and voice session hand-off in accordance with one of the exemplary embodiments; and FIG. 8 is a third table illustrating a non-exhaustive list of instances for accomplishing mobile station arbitration and voice session hand-off in accordance with one of the exemplary embodiments.

DETAILED DESCRIPTION OF EXEMPLARY EMBODIMENTS

1. Exemplary Architecture of the Access Systems

Figure 1:
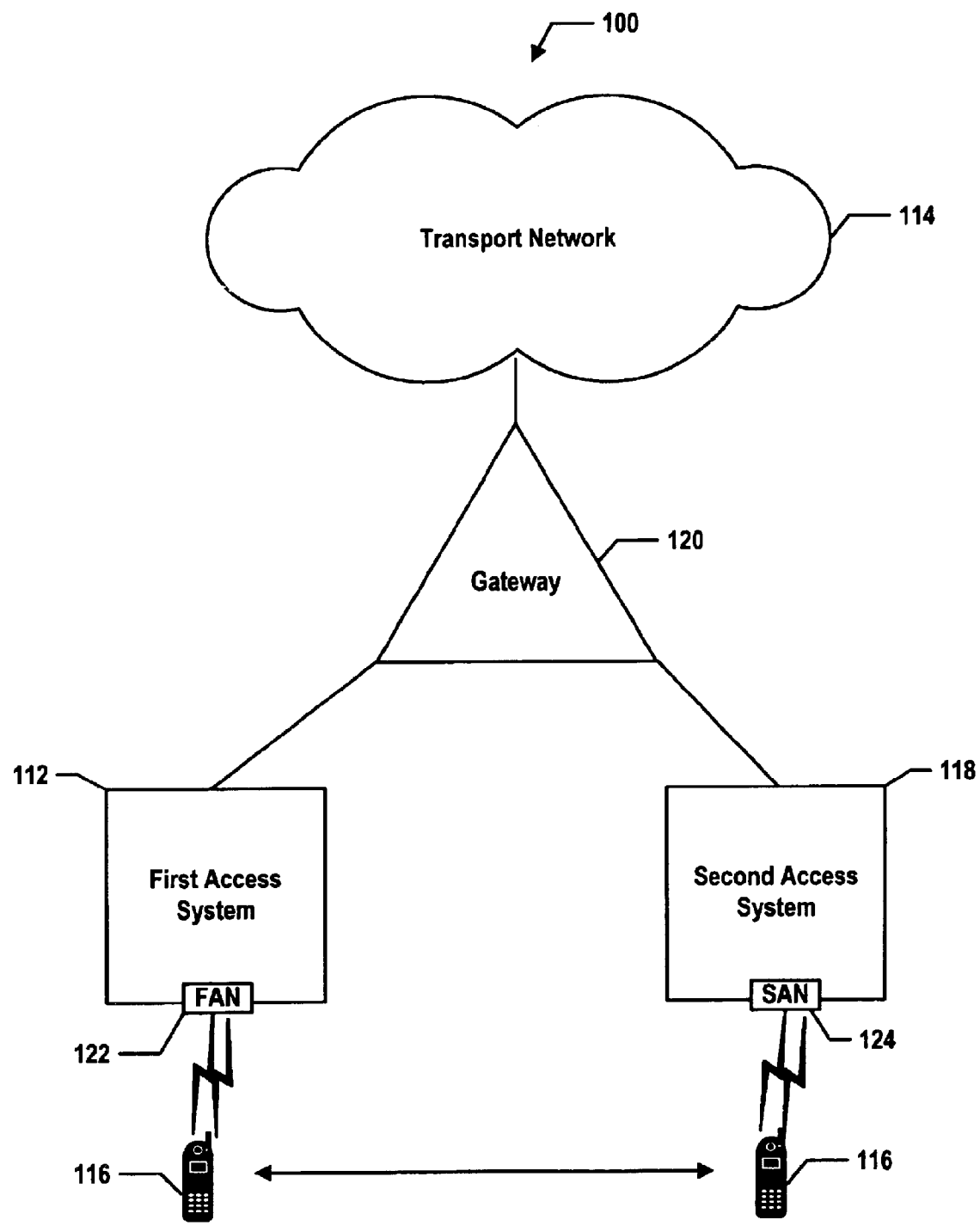
FIG. 1 is a first block diagram depicting exemplary network architecture for carrying out one of the exemplary embodiments.

Referring to the drawings, FIG. 1 generally depicts an exemplary architecture 100 for carrying out an exemplary embodiment of the invention. As shown in FIG. 1, a first access system 112 is located downstream from a common transport network 114. The first access system 112 provides a first communication path for communications exchanged between the common transport network 114 and a mobile station 116 when the mobile station 116 is operating in the first access system 112. Included in the first access system is a first access node 122. When registered and operating in the first access system 112, one segment of the first communication path may be provided by a wireless interface over which the mobile station 116 communicates with first access system 112 via the first access node 122. This segment, however, may be a wired interface (hereinafter collectively referred to as the "first interface"). The first access system 112 may also include various interconnected network elements that provide additional segments of the first communication path between the first access node 122, and the common transport network 114.

FIG. 1 also shows a second access system 118 that is also located downstream from the common transport network 114. The second access system 118 provides a second communication path to the common transport network 114 for communications exchanged between the common transport network 114 and mobile station 116. Paralleling the first access system 112, the second access system 118 includes a second access node 124. When registered with the second access system 118, one segment of the second communication path may be provided by the wireless interface over which the mobile station 116 communicates with the second access system 118 via the second access node 124. This segment, however, may be a wired interface (hereinafter collectively referred to as the "second interface"). The second access system 118 may also include various interconnected network elements that provide additional segments of the communication path between the second access node 124, and the common transport network 114.

Both the first access system 112 and the second access system 118 are communicatively coupled or otherwise connected to a common gateway 120. The common gateway 120 in turn is coupled or otherwise connected to the common transport network 114. Thus, communications exchanged between the common transport network 114 and the mobile station 116 pass through the common gateway 120. And depending on where the mobile station 116 is operating, the communications may pass through either first access system 112 or second access system 118.

2. Exemplary Communication Flow through the Access Systems

A communication session engaged in by the mobile station 116 via either the first access system 112 or the second-access system 118 may include a downstream part and an upstream part. The downstream part includes portions of the communication session emanating from the common transport network 114 and destined for the mobile station 116. Included in the downstream part is incoming voice content or bearer traffic (hereinafter referred to as "voice content") that is destined for the mobile station 116.

The incoming voice content destined for the mobile station 116, may take various forms as it travels from the common transport network 114 to the mobile station 116, via the first or second access system and the common gateway 120. For instance, when the first access system 112 communicates the incoming voice content to the mobile station 116 over the first interface via the first access node 122, it sends the incoming voice content formatted or packaged according to a first protocol ("incoming-first-protocol-voice content"). Analogously, when the second access system 118 communicates the incoming voice content to the mobile station 116 over the second interface via the second access node 124, it sends the incoming voice content to the mobile station 116 formatted or packaged according to a second protocol ("incoming-second-protocol-voice content").

The upstream part includes portions of the communication session emanating from the mobile station 116, and destined for transport into the common transport network 114. Preferably included in these portions, is outgoing voice content. As a counterpart to the incoming voice content, the outgoing voice content destined for the common transport network 114 may take various forms as it travels from the mobile station 116 to the common transport network 114.

Analogous to the downstream part, when the mobile station 116 communicates the outgoing voice content to the first access system 112 over the first interface, it sends to the first access node 122 the outgoing voice content formatted as "outgoing first-protocol voice content." This outgoing first-protocol voice content comprises outgoing voice content packaged according to the first protocol. Similarly, when the mobile station 116 sends outgoing voice content to the second access system 118, it sends the outgoing voice content over the second interface formatted or packaged according to the second protocol ("outgoing second-protocol voice content").

In a communication session engaged in by the mobile station 116 via the common gateway 120, the incoming voice content that passes through the common gateway 120 to either the first access system 112 or the second access system 118 may undergo a protocol translation. In a similar fashion, outgoing voice content that passes through the common gateway 120 from the mobile station 116 for transport into the common transport network 114 may also undergo a protocol translation. If the communication session is to undergo a protocol translation, the common gateway 120 may perform the protocol translation. The protocol translation, however, may be performed by other elements upstream from the first and second interfaces in the first or second access system, respectively, including elements in the common transport network 114, the first access system 112, and/or the second access system 118.

If, for example, the mobile station 116 communicates via the first access system 112, and the common gateway 120 receives incoming first-protocol voice content, the common gateway 120 may simply pass (or route) the incoming first-protocol voice content to the first access system 112. On the other hand, if the common gateway 120 receives incoming voice content that does not conform to the first protocol, it may translate the incoming voice content according to the first protocol to yield incoming first-protocol data. After the translation, the common gateway 120 may then route the incoming first-protocol voice content to the first access system 112 for transmission to the mobile station 116.

For outgoing first-protocol voice content received from the first access system 112, the common gateway 120 may translate it, if necessary, according to an appropriate protocol for transmission into the common transport network 114 or other upstream element (not shown). After translation, if any, the common gateway 120 may then route the translated or un-translated outgoing first-protocol voice content to the common transport network 114 or other upstream element.

Similarly, if the mobile station 116 communicates via the second access system 118, and the common gateway 120 receives incoming second-protocol voice content, the common gateway 120 may simply pass (or route) the incoming second-protocol voice content to the second access system 118 un-translated. Alternatively, if the common gateway 120 receives incoming voice content that does not conform to the second protocol, the common gateway 120 may translate the incoming voice content according to the second protocol to yield incoming second-protocol data. Once translated, the common gateway 120 may route the incoming second-protocol voice content to the second access system 118 for transmission to the mobile station 116.

When the common gateway 120 receives outgoing second-protocol voice content that is destined for an upstream recipient and the outgoing second-protocol voice content conforms to the same protocol that is used for transport to the upstream destination, the common gateway 120 may simply relay the outgoing second-protocol voice content to the transport network 114. When the common gateway 120 receives outgoing second-protocol voice content from the second access system 118 that does not conform to an appropriate protocol for transmission to the common transport network 114, the common gateway 120 may translate the outgoing second-protocol voice content according to the appropriate protocol, as needed. After translation, the common gateway 120 may then route the translated outgoing second-protocol voice content to the common transport network 114 or other upstream element.

In addition to providing translation, the common gateway 120 may facilitate hand-offs for ongoing communication sessions engaged in by the mobile station 116 via either the first access system 112, or the second access system 118. The common gateway 120 may operate as follows. Before handing off, the common gateway 120 passes to the first access system 112 incoming first-protocol voice content of the downstream part of the ongoing communication session. In the upstream part, outgoing voice content from the mobile station 116 may be passed by the common gateway 120 to the common transport network 114 either translated or untranslated, depending on the communication session protocol upstream from the common gateway 120. When instructed to hand-off the ongoing communication session, the common gateway 120 switches from routing the incoming first-protocol voice content to the first access system 112 to routing the incoming first-protocol voice content to the second access system 118, translating as needed. After receiving outgoing second-protocol voice content of the ongoing (and continued) communication session from the mobile station 116 via second access system 118, the common gateway 120 routes the outgoing second protocol voice content into the common transport network 114, again, translating as needed.

When the mobile station 116 engages in an ongoing communication session via the first access system 112, the mobile station 116 communicates with the first access system according to a particular protocol, namely the first protocol. If the mobile station 116 roams into, moves into or otherwise begins to operate in the coverage area of the second access system 118 during the ongoing communication session via the first access system 112, the mobile station 116 may benefit from handing off the communication session to the mobile station 116 operating in the second access system 118. The mobile station 116 and the second access system 118, however, communicate using a second protocol, which is a different protocol than the first protocol.

Given that the mobile station 116 communicates with the second access system 118 according to the second protocol, after the hand-off, the mobile station 116 may continue the communication session via the second access system 118 according to the second protocol over the first protocol. For example, the incoming voice content in the downstream part communicated to the mobile station 116 from the second access system 118 as incoming second-protocol voice content may comprise incoming-first-protocol voice content encapsulated in headers of the second-protocol (hereinafter referred to as "incoming-second-protocol-encapsulated-first-protocol voice content"). Alternatively, the incoming-second-protocol-encapsulated-first-protocol voice content may comprise the incoming-first-protocol voice content that, as opposed to being encapsulated, is encoded or otherwise converted into a transmission format according to the second protocol so as to produce incoming-second-protocol-encoded-first-protocol voice content.

For the upstream part, the outgoing voice content communicated from the mobile station 116 to the second access system 118 as outgoing-second-protocol voice content may comprise outgoing-first-protocol voice content encapsulated in headers of the second-protocol (hereinafter referred to as "outgoing-second-protocol-encapsulated-first-protocol voice content"). Alternatively, the outgoing-second-protocol-encapsulated-first-protocol voice content may comprise the outgoing-first-protocol voice content that, as opposed to being encapsulated, is encoded or otherwise converted into a transmission format according to the second protocol so as to produce outgoing-second-protocol-encoded-first-protocol voice content.

For convenience, incoming-second-protocol-encapsulated-first-protocol voice content and incoming-second-protocol-encoded-first-protocol voice content will be collectively referred to hereinafter as incoming-second-protocol-encapsulated-first-protocol voice content. Likewise, outgoing-second-protocol-encapsulated-first-protocol voice content and outgoing-second-protocol-encoded-first-protocol voice content will be collectively referred to hereinafter as outgoing-second-protocol-encapsulated-first-protocol voice content.

Because the incoming first-protocol voice content may incorporate encapsulated incoming voice content in headers of the first protocol, the incoming-second-protocol-encapsulated-first-protocol voice content may include the headers of both the first protocol and second protocol. Alternatively, the outgoing-first-protocol voice content may also include the incoming voice content that, as opposed to being encapsulated, is encoded or otherwise converted into a transmission format according to the first protocol. Consequently, the incoming-second-protocol-encapsulated-first-protocol voice content may further include incoming voice content encoded in the first protocol that is encapsulated in headers of the second protocol.

The mobile station 116 may create outgoing-second-protocol encapsulated first-protocol voice content by encapsulating or concatenating the outgoing-first-protocol voice content in headers of the second protocol. The headers of the second protocol may include both headers and footers, if the second protocol defines both. For example, the second protocol may define a second protocol package that has a header, footer, and payload in which the payload includes the voice content being communicated.

To encapsulate the outgoing-first-protocol voice content in headers of the second protocol, the mobile station 116 may place or embed the outgoing-first-protocol voice content in the payload of one or more second-protocol packages to produce outgoing-second-protocol-encapsulated-first-protocol data. Similar to the incoming-first-protocol voice content, the outgoing-first-protocol voice content may itself incorporate encapsulated outgoing voice content in headers of the first protocol.

The outgoing-second-protocol-encapsulated-first-protocol voice content includes outgoing voice content encapsulated in the headers of the first protocol within the headers of second protocol. Alternatively, the outgoing-first-protocol voice content may also include the outgoing voice content encoded or otherwise converted into a transmission format according to the first protocol. Consequently, the outgoing-second-protocol-encapsulated first-protocol voice content may further include outgoing voice content encoded in the first protocol, which is then encapsulated in headers of the second protocol.

3. Mobile Station's Modes

The mobile station 116 may contain at least two communication modes. In one of these communication modes, the mobile station 116 operates according to the first protocol ("first-protocol mode"). In another of the communication modes, the mobile station 116 operates according to the second protocol ("second-protocol mode"). In still another alternative communication mode, the mobile station 116 may operate in the second access network 118 using the second protocol over the first protocol ("second-over-first-protocol mode"). Other modes are possible, as well.

The mobile station 116 may use the first-protocol mode in the first access network 112 and the second-over-first-protocol mode in the second access network 118 to carry or hand-off an ongoing communication session engaged in by the mobile station 116 via the first network to the mobile station 116 operating in the second access network. In the second-over-first-protocol mode, the mobile station 116 may advantageously use a first-protocol encoder/decoder for communicating with both the first access system 112 and the second access system 118.

When operating in the second-access system 118, the mobile station 116 using its second-over-first-protocol mode may strip the second-protocol encapsulation from the incoming-second-protocol-encapsulated-first-protocol voice content. Striping the second protocol encapsulation uncovers the incoming-first-protocol voice content. If the second-protocol encapsulation includes second-protocol encoding, then striping may also include decoding the second-protocol encoding as well. After stripping the encapsulation, the mobile station 116 may use its first-protocol encoder/decoder to decode the incoming-first-protocol voice content to yield the incoming voice content.

Moreover, for outgoing voice content, the mobile station 116 may encode outgoing voice content using the first-protocol encoder/decoder to create outgoing first-protocol data. Then, for transmission to the second access system 118, the mobile station 116 encapsulates the outgoing-first-protocol voice content into one or more second protocol packages.

4. Mobile Station Arbitration

To communicate in either the first access system 112 or the second access system 118, the mobile station 116 may use one of its at least two modes. To select which mode to use, the mobile station 116 employs one or more rules or policies, which allocate the mobile station's 116 resources to the selected mode. The process of determining or selecting which mode to use based on these rules or polices may be referred to as arbitration. And the rules or policies may be referred to as arbitration policies. The arbitration polices may be programmed into the mobile station 116 or may be downloaded from the first-access system 112, the second access system 118 or other system not shown. The arbitration policies may be user selectable, or fixed by a subscriber profile or a subscriber's subscription plan associated with the mobile station 116.

The arbitration policies may include (i) class-of-service attributes, such as flat rate services or priority of service; (ii) quality of service attributes, such as assigning priority to circuit-switched to packet data Voice over IP conversions; and (iii) preferred network attributes, such as the relative signal strength of the first access system 112 as compared with the second access system 118. Other preferred network attributes may include (i) the lowest relative cost, (ii) the fastest relative transmission rate, (iii) the greatest relative security, and (iv) the load balance between the first access system 112 and the second access system 118. The arbitration policies may take other forms as well. Further, the arbitration policies may be arranged in hierarchical form, such that one arbitration policy takes precedence over another. Alternatively, the arbitration policies may be equally weighted.

Figure 2:
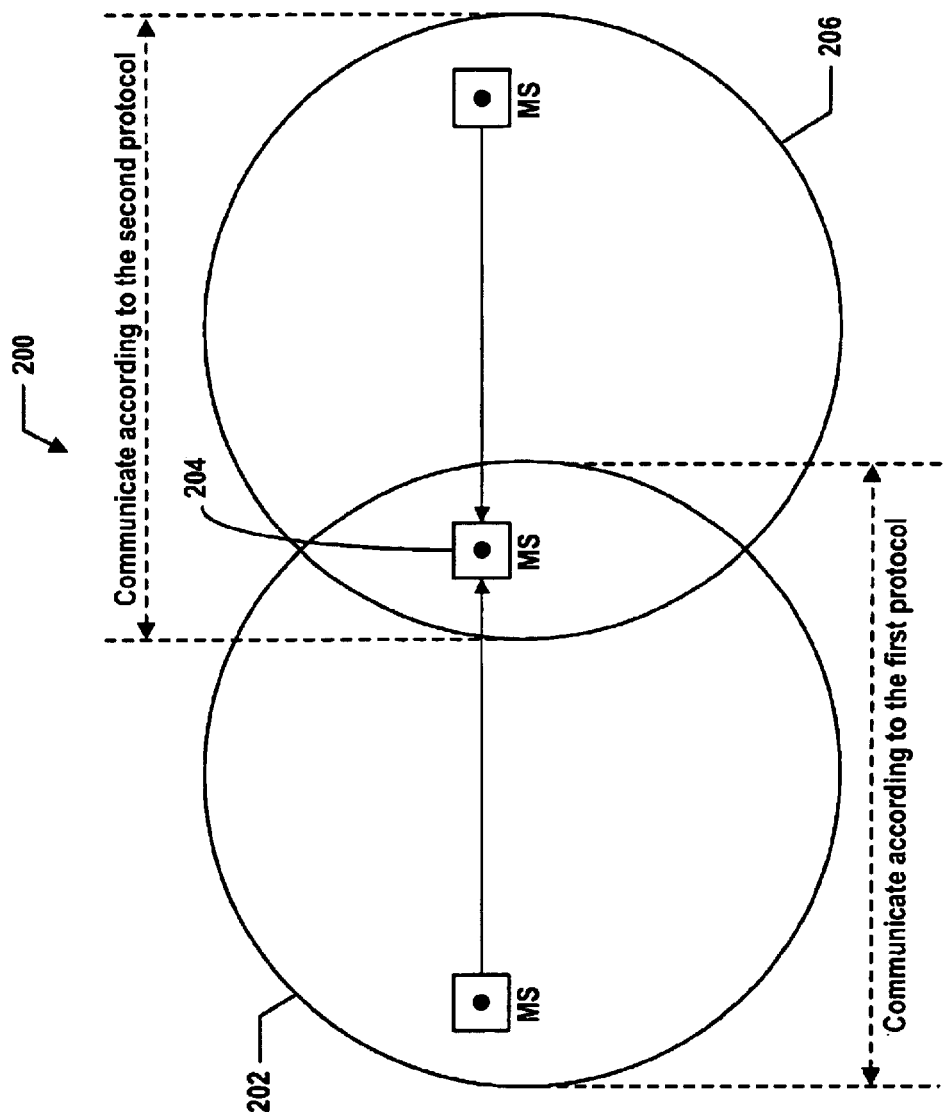
FIG. 2 is a second block diagram depicting a multiple-access-system-coverage area for mobile station arbitration in accordance with one of the exemplary embodiments.

FIG. 2 depicts a multiple-access-system-coverage area 200 in which a mobile station 116 arbitrates between carrying on a voice session ("first-voice session") according to the first protocol in the first access system 112 and carrying on another voice session ("second-voice session") according to the second protocol over the first protocol in the second access system 118 in accordance with an exemplary embodiment. With reference to FIGS. 1 and 2, mobile station arbitration may operate as follows.

As shown in FIG. 2, the mobile station 116 engages in a first-voice session using its first-protocol mode in the coverage area 202 of the first-access system 112. The mobile station 116 roams into, enters into or otherwise begins operating into location 204 in which the it can communicate according to a first protocol via a first-access system and/or communicate according to a second protocol via a second-access system. In location 204, the mobile station 116 may arbitrate between communicating voice content according to the first protocol via the first-access system 112 and communicating voice content according to the second protocol over the first protocol via the second-access system 118.

Similarly, the mobile station 116 may engage in a second-voice session using its second-over-first-protocol mode in the coverage area 206 of the second-access system 118. The mobile station 116 may then roam into, enter into or otherwise begin operating into location 204 in which the it can communicate according to a second protocol via a second-access system and/or communicate according to the first protocol via a first-access system. In location 204, the mobile station 116 may arbitrate between communicating voice content according to the first protocol via the first-access system 112 and communicating voice content according to the second protocol over the first protocol via the second-access system 118.

As illustrated in FIG. 2, the coverage area 202 of the first-access system 112 and the coverage area 206 of the second-access system overlap. Location 204 is shown to exist in the overlap area. The overlap of coverage area 202 and the coverage are 206 may differ. For instance, coverage area 206 may be entirely incorporated into the coverage area 202 and vice-versa.

5. Exemplary Mobile Station Architecture

Figure 3:
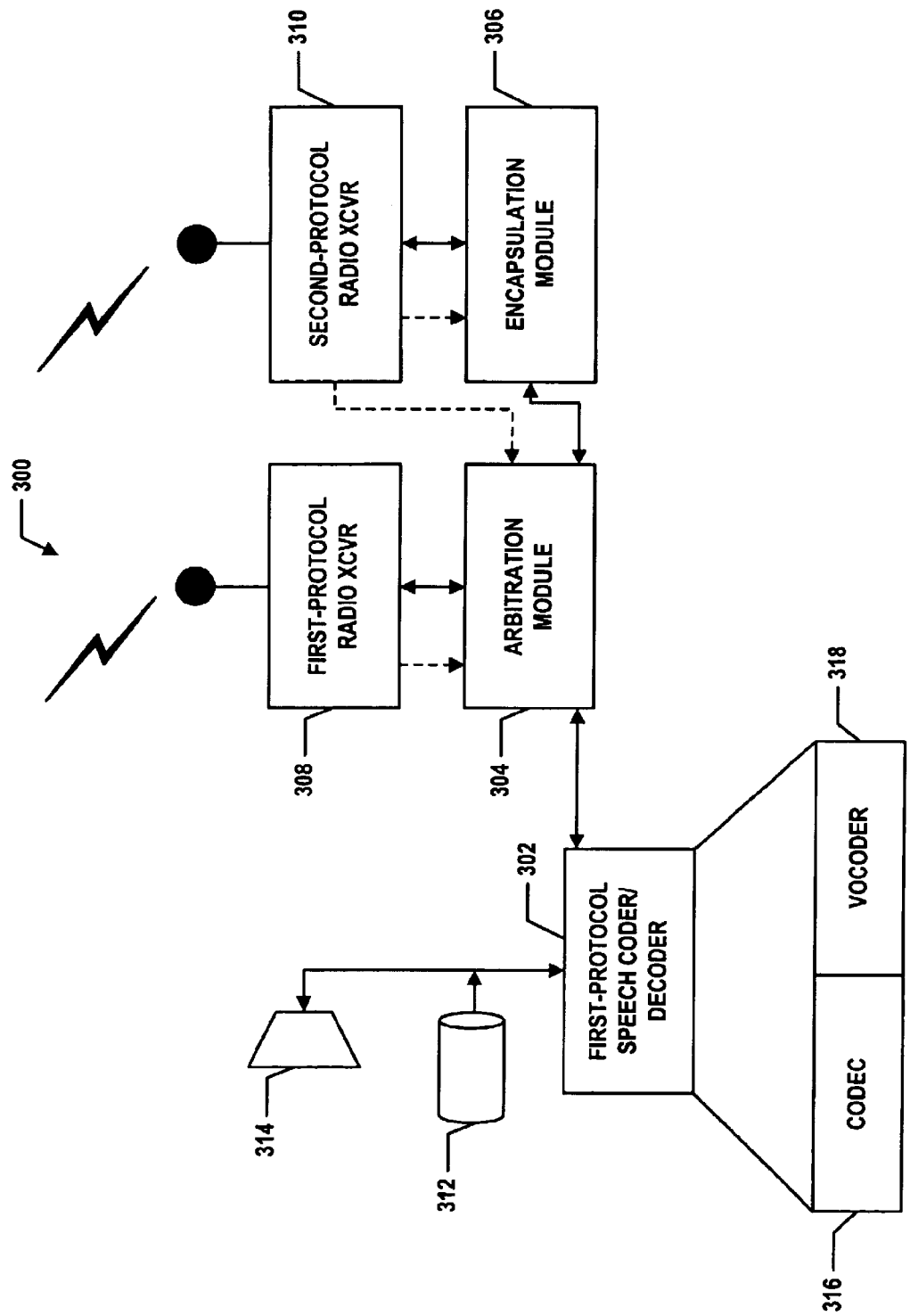
FIG. 3 is a third block diagram depicting exemplary architecture of a mobile station for carrying out voice session arbitration in accordance with one of the exemplary embodiments.

FIG. 3 illustrates exemplary architecture 300 of a mobile station for carrying out voice session arbitration in accordance with an exemplary embodiment. The architecture 300 includes a first-protocol speech coder/decoder 302, an arbitration module 304, an encapsulation module 306, a first-protocol transceiver 308, and a second protocol transceiver 310.

As illustrated in FIG. 3, the first-protocol speech coder/decoder 302 is communicatively coupled or otherwise connected to the arbitration module 304. The first-protocol speech coder/decoder 304 may comprise one or more processors and executable programmable code, which interface with one or more logic modules. Among the logic modules are a coder/decoder (CODEC) module 316 and a voice codec (VOCODER) module 318. The CODEC module 316 converts voice content into compressed packet data or other digital data, and likewise, converts compressed voice-content packet data back into voice content. Alternatively, the CODEC module 316 may be a set or "soft-module" of programmable code executable by the processor to perform the same functions.

While the CODEC module may be contained in a single logic or software module, in an alternative embodiment, the CODEC module 316 may be distributed among one or more logic modules. The CODEC module 316 may encode the voice session according to CODECs such as: (i) Pulse Code Modulation (PCM), (ii) Adaptive Differential Pulse Code Modulation (ADPCM), (iii) Code-Excited Linear Predictive (CELP), (iv) Relaxed Code-Excited Linear Predictive (RCELP), (v) Linear Predictive Coding (LPC), and/or other CODEC.

The VOCODER module 318 may be implemented as one or more logic or software modules. The VOCODER module 318 further converts voice content in compressed packet data or other digital data for transmitting the voice session according to the first-protocol. The VOCODER module 318 also converts first protocol compressed-voice-content packet data back into voice content for transmission to the CODEC module. In an exemplary embodiment, the VOCODER module 318 may encode/decode voice content using (i) Adaptive Code-Excited Linear Predictive (ACELP), (ii) CDMA Qualcomm Code-Excited Linear Predictive (QCELP) (iii) EVRC, (iv) Selective Mode Vocoder (SMV), (v) CDMA4000-SMV, (vi) Adaptive Multirate GSM (AMR-GSM), (vii) Improved Multiband Excitation (IMBE), (viii) Sinusoidal Transform Coder (STC), (ix) Federal Standard 1017, (x) IS-54, (xi) IS-641, and/or other communication vocoder.

In operation, the mobile station 318 receives outgoing voice content from a user via a microphone, other speech-energy receiver, or speech-energy input/output device 312. This outgoing voice content is then received by the first-protocol speech coder/decoder 302. Using its CODEC module 316, the speech coder/decoder 302 encodes the outgoing voice content into outgoing-encoded voice content. Thereafter, the VOCODER module 318 further encodes the outgoing encoded voice content into outgoing-first-protocol voice content, which may be sent to the arbitration module 304. For incoming-first-protocol voice content received from the arbitration module 304, the first-protocol speech coder/decoder 302 reverses the functions carried out by the VOCODER module 318 and CODEC module 316 to send decoded voice content to the user via a speaker or other speech energy transmitter 314 or the speech-energy input/output device 312.

Using one or more arbitration polices, the arbitration module 304 arbitrates between engaging in a voice session according to the first protocol via the first-access-system 112 and engaging in the same or a second voice session according to the second protocol over the first protocol via the second-access-system 118. The arbitration module 304 may include at least one processor, programmable instructions executable by the processor, an input for receiving signals indicative of arbitration policies and thresholds. The arbitration module 304 may also include one or more switches for coupling the outgoing-first-protocol voice content from the first-protocol speech coder/decoder 302 and for coupling the incoming-first-protocol voice content to the first-protocol speech coder/decoder 302. As one skilled in the art will recognize, the functions carried out by the processors and the corresponding executable instructions may be easily substituted with logic devices or hardware modules. Consequently, the arbitration module 304 may take other forms as well.

As will be described in more detail below, when receiving outgoing-first-protocol voice content from the first-protocol speech coder/decoder 302, the arbitration module 304 arbitrates (or selects based on the arbitration policies) between relaying the outgoing-first-protocol voice content (i) to the first-protocol transceiver 308 and (ii) to the second protocol transceiver 310 via the encapsulation module 306. If the arbitration module 304 allocates the mobile station's resources for communicating the voice session to the first-access-system 112, the arbitration module 304 switches or otherwise relays to the first-protocol transceiver 308 the outgoing-first-protocol voice content. Further, the arbitration module 304 may route incoming-first-protocol voice content from the first-protocol transceiver 308 to the first-protocol speech coder/decoder 302 when the mobile station's resources are likewise allocated.

The first-protocol transceiver 308 may include one or more processors and executable programmable code, both of which interface with one or more logic modules and a first-protocol transmitter/receiver module. When the first-protocol transceiver 308 receives from the arbitration module 304 outgoing first-protocol voice content, it may encode the outgoing-first-protocol voice content for transmission to the first-access node 122. For instance, in a CDMA-format public wireless network, the outgoing-first-protocol voice content may be CDMA encoded (i.e., fragmented and reassembled) for Direct Sequence Spread Spectrum (DSSS) spreading for transmission to a BTS. For incoming-first-protocol voice content received from the BTS, the first-protocol transceiver 308 may decode the DSSS spreading and relay the decoded incoming-first-protocol voice content to the arbitration module 304.

On the other hand, if the arbitration module 304 allocates the mobile station's resources to communicate the voice session to the second-access system 188, it sends outgoing-first-protocol voice content to the encapsulation module 306. With the mobile station's 116 resources allocated as such, when receiving un-encapsulated first-protocol voice content from the encapsulation module 306, the arbitration module 304 may relay it to the first-protocol speech coder/decoder 302.

As the module's name suggests, the encapsulation module 306 may encapsulate the first-protocol voice content in headers of another protocol. To facilitate encapsulation, the encapsulation module includes one or more processors and executable programmable code, which interface with at least one input for receiving first-protocol voice content and at least one output for providing second-protocol-encapsulated-first-protocol voice content.

When receiving outgoing-first-protocol voice content from the arbitration module 304, the encapsulation module 306 encapsulates it with headers from the second protocol so as to produce second-protocol-encapsulated-first-protocol voice content. For instance, the encapsulation module 306 may take outgoing EVRC-encoded voice content and encapsulate it in headers defined by the IEEE 802.11 specification so as to produce outgoing-802.11-framed-EVRC-encoded voice content.

The encapsulation module 306 may also double as a un-encapsulation module. That is, when receiving incoming-second-protocol-encapsulated-first-protocol voice content, the encapsulation module 306 may strip the headers of the second protocol from the incoming-first-protocol voice content. Thereafter, the encapsulation module 306 may then relay the incoming-first-protocol voice content to the arbitration module 304.

Coupled or otherwise connected to the encapsulation module 306 is a second-protocol transceiver 310. Similar to the first-protocol transceiver 308, the second-protocol transceiver 310 may include one or more processors and executable programmable encode that interface with one or more logic modules and a second-protocol transmitter/receiver module. After receiving outgoing-second-protocol-encapsulated-first-protocol voice content from the encapsulation module 306, the second-protocol transceiver 310 may encode it for transmission to the second-access node 124. For example, outgoing-802.11-framed-EVRC-encoded voice content received by the second-protocol transmitter 310 may be fragmented for Direct Sequence Spread Spectrum (DSSS) spreading or for frequency hopping. Once encoded, the second protocol transmitter sends the DSSS spread or frequency hopped outgoing-802.11-framed-EVRC-encoded voice content to the second-access node 124, which may be embodied as a wireless access point.

For incoming-second-protocol-encapsulated-first-protocol voice content received from the second-access node 124, the second-protocol transceiver 310 may decode the DSSS spreading or frequency hopping. Thereafter, the second-protocol transceiver 310 may relay the incoming-second-protocol-encapsulated-first-protocol voice content to the encapsulation module 306. Following the example noted above, after receiving fragmented DSSS spread or frequency hopped incoming-802.11-framed-EVRC-encoded voice content, the second-protocol transceiver 310 de-fragments and/or reassembles the DSSS spread or frequency hopped incoming-802.11-framed-EVRC-encoded voice content and then relays it to the encapsulation module 306 for additional processing.

Although the first-protocol speech coder/decoder 302, the arbitration module 304, the encapsulation module 306, the first-protocol transceiver 308, and the second protocol transceiver 310, as described, employ one or more processors and corresponding executable programmable code, the mobile station 116 may employ one or more global processors and corresponding global executable programmable code to centralize and simplify the mobile station's resources and complexity.

Arbitration is especially useful for hand-offs of ongoing voice sessions. The benefits include off-loading voice traffic from public wireless networks to private wireless networks, reducing cost for subscribers and/or increasing the transmission rate for enhanced voice quality. Further, by allowing the subscriber to select alternative access, subscriber satisfaction may improve.

6. Public to Private Wireless Network Arbitration and Hand-Off

Figure 4:
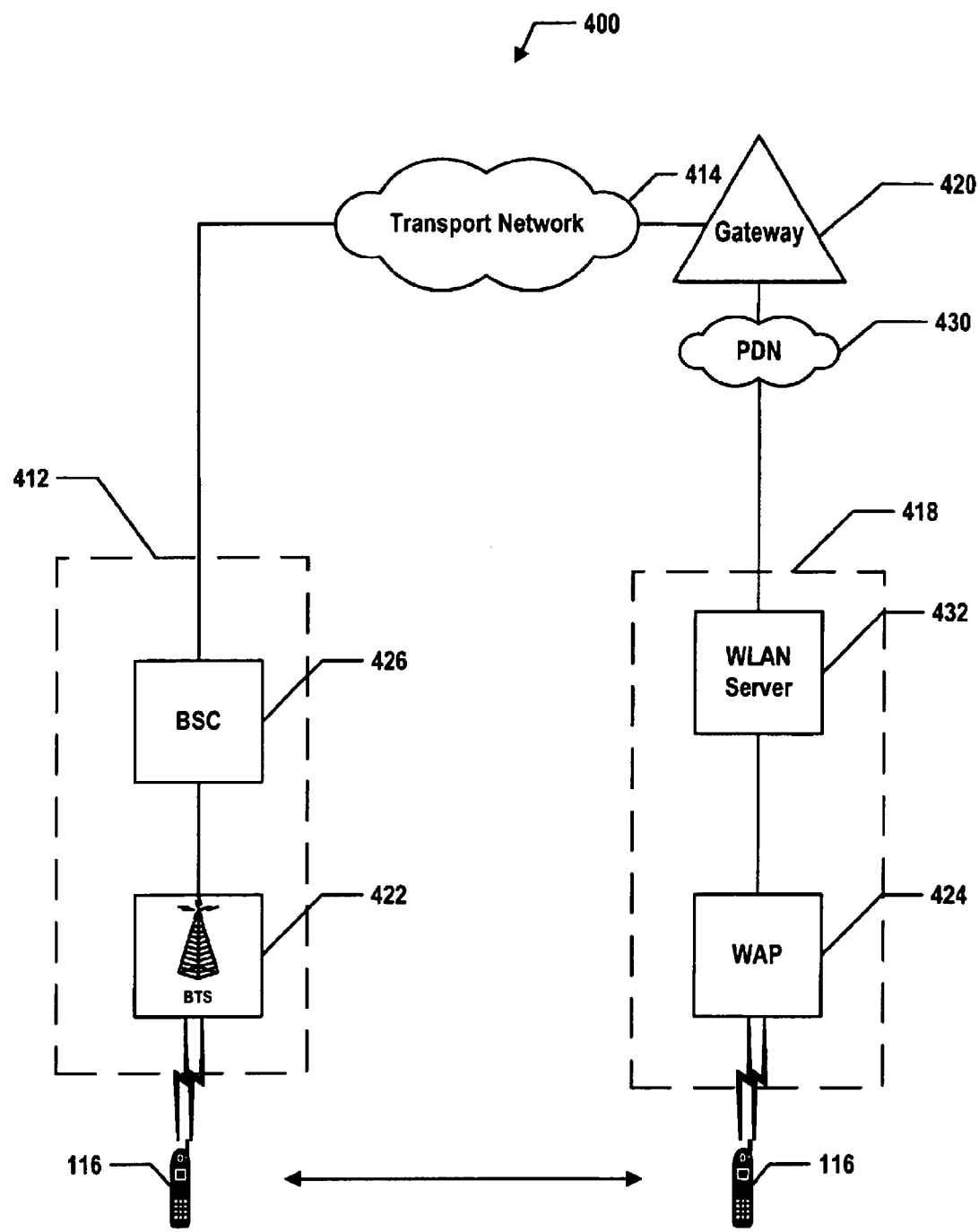
FIG. 4 is a fourth block diagram depicting exemplary network architecture for carrying out mobile station arbitration and communication session hand-off in accordance with one of the exemplary embodiments.

FIG. 4 illustrates exemplary architecture 400 for carrying out mobile station arbitration and communication session hand-off in accordance with an exemplary embodiment. The architecture 400 includes a transport network 414, a public wireless network 412 that is communicatively coupled to the transport network 414, and a private wireless network 418 that is also communicatively coupled with the transport network 414. Also included in architecture 400 is a gateway 420, which is likewise communicatively coupled to the transport network 414.

Public wireless network 412 provides wireless telecommunications services, in a particular geographic coverage area, to its subscribers and, typically, to other wireless networks' subscribers who are roaming in the coverage area of network 412. Generally, any interested member of the public meeting minimal criteria may become a subscriber of public wireless network 412. Additionally, the coverage area of public wireless network 412 is typically wide-ranging. For example, the coverage area of network 412 may encompass a metropolitan area, a substantial part of a metropolitan area, or numerous metropolitan areas.

The private wireless network 418 may provide geographically limited wireless and wireline telecommunications services to its subscribers. The coverage area of the private wireless network 418, however, maybe more limited than the public wireless network 412. For instance, the coverage area of the private wireless network 418 may include a single building, a part of a building, or a complex of buildings and campuses, but such coverage is unlikely to cover large contiguous areas.

Further, the subscriber base of the private wireless network 418 may be more limited than the public wireless network 412. A private wireless network subscriber may be a person, an organization, or other entity (including a computer or computer system) that uses the services provided by the private wireless network 418, after being granted permission to use such services. Private wireless network subscribers may include, for example, (i) employees of an enterprise or other organization; (ii) business consultants, who subscribe only for the duration of a particular project; and (iii) members of the general public, who receive limited-communication services from a private wireless network provider, such as in-airport flight updates while in the coverage area of an airport's private wireless network.

The wireless communications provided by public wireless network 412 may conform to a format such as AMPS, TDMA, GSM, CDMA, Wideband CDMA, CDMA2000, UMTS or some other format. The wireless communications provided by private wireless network 418 may conform to a format such as an IEEE 802.11 wireless-local-area-network protocol (WLAN), AMPS, TDMA, GSM, CDMA, wideband CDMA, CDMA2000, UMTS, and/or some other format. Preferably, the public wireless network 412 and the private wireless network 414 do not use the same format. Most preferably, the public wireless network conforms to CDMA, and the private wireless network conforms to the IEEE 802.11 wireless local area network protocol. Details of a preferred CDMA air interface are set forth in the ANSI/TIA/EIA-95-B-99 standard published by the Telecommunications Industries Association/Electronic Industries Association (TIA/EIA), which is fully incorporated herein by reference. Further, the particulars of the preferred wireless communication for the private wireless network 418 are disclosed in the IEEE 802.11 standard published by the Institute of Electrical and Electronics Engineers, Inc., which is fully incorporated herein by reference.

A. Public Wireless Network

When operating in the public wireless network's coverage area, the public wireless network 412 provides telecommunication services, or more simply "serves," the mobile station 116. As noted above, the public wireless network 412 is communicatively coupled to the transport network 414. And as such, the public wireless network 412 provides a first communication path for communications exchanged between the transport network 414, and the mobile station 116, when the mobile station 116 is operating in public wireless network 412. Included in the public wireless network 412 are various interconnected network elements providing one or more segments of the communication path. Among these interconnected network elements are a BTS 422 coupled to a BSC 426 that in turn is communicatively coupled to the transport network 414 (as in the case of the transport network 414 representing or providing access to a PSTN).

The BTS 422 generally includes one or more antennas that define a wireless coverage area, or "cell," for the public wireless network 412. Although FIG. 4 illustrates only one BTS, namely BTS 422, the public wireless network 412 may include more than one BTS. In one arrangement, the cell may be partitioned into "sectors" using directional antennas. Within the coverage area of the cell, the BTS 422 and other BTSs (not shown) may communicate with the mobile station 116 over a wireless interface.

In communications exchanged between the mobile station 116 and the BTS 422, the format of the communications conform to a particular protocol, which typically is defined by the format of the public wireless network. By way of example, in a public wireless network 412 that conforms to the CDMA format, the mobile station 116 and the BTS 422 may transmit communications over the wireless interface using the Enhanced Variable Rate Coder (EVRC) standard. Details of the preferred Enhanced Variable Rate Coder standard are set forth in the TIA/EIA/IS-127 standard, published by the Telecommunications Industries Association/Electronic Industries Association (TIA/EIA), which standard is fully incorporated herein by reference.

The BSC 426 typically manages the BTSs under its control; managing such parameters as the BTSs' power levels and frequencies transmitted. The BSC 426 may also control communication session hand-offs for the mobile station 116 moving between the several BTSs. Accordingly, the BSC 426 may contain (intelligent) switching functionality, generally found within the domain of other network elements, such as an MSC (not shown). After receiving instructions or "signaling" to direct a given communication session to the transport network 414 from the MSC, the gateway 420, or some other switch, the BSC 426 may then provide a communication path between the mobile station 116 and the transport network 414.

Although other signaling systems may be used, the signaling between the BSC 426 and the MSC, the gateway 420, or some other switch may be carried out using IS-41 or GSM Mobile Application Part MAP (GSM MAP). Details of the IS-41 signaling system may be found in the ANSI/TIA/EIA-41-D-97 standard, which was published in 1997, and which is fully incorporated herein by reference. Furthermore, details of GSM MAP signaling system may be found in the European Telecommunications Standards Institute ETS 300 599 ed.9 standard (GSM 09.02 version 4.19.1), which was published in 2001, and which is fully incorporated herein by reference.

The content of a communication session transmitted by the BSC 426 to the transport network 414 may contain encoded and/or vocoded voice or bearer content in accordance with a protocol such as International Telecommunications Union (ITU) G.711 standard. Other protocols may be used as well. In the preferred CDMA format, the mobile station 116 and BSC 426 exchange the voice content of the communication session according to the EVRC standard. In turn, if the transport network 414 comprises a PSTN, when receiving outgoing EVRC voice content from the mobile station 116, the BSC 426 may then convert it into Pulse Code Modulation (PCM) voice content. Thereafter, the BSC 426 may transmit the PCM voice content into the transport network 414, which may then be transmitted to the gateway 420. Conversely, when receiving incoming voice content in PCM format, then the BSC 426 may convert or encode the incoming data into incoming EVRC voice content for transmission to the mobile station 116.

Although shown as an element separate from the BTS 422, as an alternative, the BSC 426 may be co-located with one of the BTSs. As another alternative, the BSC 426 may be co-located with a MSC or the functions carried out by the MSC may be integrated into BSC 426. In yet another alternative, the BSC 426 might not be used at all, and in which case one or more of the various interconnected elements of the public wireless network may carry out its functions.

B. Private Wireless Network

Architecture 400 also includes private wireless network 418 that is communicatively linked with the transport network 414 via a PDN 430. When registered in the private wireless network 418 and in the coverage area of the private wireless network, the private wireless network 418 serves telecommunication services to the mobile station 116. Analogous to the public wireless network 412, the private wireless network 418 provides a second communication path for communications exchanged between the transport network 414 and the mobile station 116. Preferably, the coverage area of the private wireless network 418 and the coverage area of the public wireless network overlap; however, such overlap is not required. In an overlap situation, when registered in the private wireless network 418, the mobile station 116 may be simultaneously registered in the public wireless network. Further details regarding the communication control for simultaneous registration of a mobile station in both a public wireless network and private wireless network are provided by pending U.S. application Ser. No. 09/595,595, filed on Jun. 15, 2000, and entitled "Private Wireless Network Integrated with Public Wireless Network," which is fully incorporated herein by reference.

The private wireless network 418 comprises various interconnected network elements that provide one or more segments of the second communication path. In the IEEE 802.11 WLAN embodiment of the private wireless network 418, the WLAN includes a wireless access point 424 interconnected with a WLAN server 432.

The wireless access point 424 provides base station functionality for the WLAN. Base station functionality furnishes the mobile station with access to the WLAN via the wireless interface. In addition to furnishing access for the mobile station 116 to exchange communications with the WLAN, the wireless access point 424 also acts as a bridge and/or "portal" between the mobile station 116 and the WLAN server 432. The wireless access point 424 performs portal functions by providing address and protocol translation for communications exchanged between the wireless access point 424 and the WLAN server 432. Exemplary architecture to carry out these functions may be provided by a wireless access point 424 that consist of a radio transceiver, a wired-network interface, and a bridging-software application, which may conform to the IEEE 802.11d bridging standard.

Alternatively, the portal's functionality may be integrated into the WLAN server 432, so that communications exchanged between the wireless access point 424 and the WLAN server 432 are transmitted without being translated. As another option, the portal may comprise a standalone WLAN network element, for example, a bridge or gateway interconnecting the wireless access point 424 and WLAN server 432.

In a communication session, the wireless access point 424 communicates with the mobile station 116 over the wireless interface according to the IEEE 802.11 protocol format (IEEE 802.16). If functioning as a portal, the wireless access point 424 may translate the communication session from the IEEE 802.11 protocol format into an IEEE 802.3 protocol, or other packet-data format for transport to the WLAN server 432.

Situated between the transport network 414 and the wireless access point 424 is the WLAN server 432, the gateway 420 as well as other various interconnected network elements. The WLAN server 432 provides a portion of the second communication path for routing communications between the wireless access point 424 and the transport network 414. Exemplary architecture for the WLAN server 432 may include a processor, e.g., personal computer or workstation, or a peripheral device, such as a data storage device, that runs operating and application software for managing the resources for the WLAN.

In an exemplary embodiment, the WLAN server 432 includes architecture and application software that allows the WLAN server 432 to communicate with the gateway 420 according to the Internet Protocol ("IP") or some other packet data protocol. As described in more detail below, for mobile station arbitration and communication hand off, the WLAN server 432 may take advantage of the ability to communicate according to IP.

Although FIG. 4 illustrates only one access point 424, and one WLAN server 432, the private wireless network 418 may include one or more wireless access points and one or more WLAN servers. Alternatively, the private wireless network 418 might not include a WLAN server 432 as a separate element, in which case the functions of the WLAN server 432 may be integrated into the wireless access point 424. In yet another arrangement, the private wireless network might not include either a wireless access point or WLAN server as separate network elements. And as such, the wireless access point's functionality and WLAN server's functionality may be integral to or integrated into one or more of the other various interconnected private wireless network elements (not shown).

C. Gateway

As noted above, illustrated in FIG. 4 is the gateway 420 that is communicatively coupled to the transport network 414 and to the WLAN server 432 via the PDN 430. Gateway 420 may provide a protocol encapsulation/unencapsulation function for facilitating a hand-off of an ongoing communication session engaged in by the mobile station 116 via the public wireless network 412 or via the private wireless network. Gateway 420 may also provide an encoding function to encode and decode data of the ongoing communication session. Additionally, gateway 420 may include switching functionality to switch from routing the ongoing communication session to the mobile station 116 via the public wireless network 412 to routing the ongoing communication session to the mobile station 116 via the private wireless network 418 (and vice versa).

Exemplary architecture of gateway 420 includes a (i) signaling controller for signaling elements of the private and public wireless networks, (ii) a media gateway for sending and receiving communications over a packet-switched data network, and (iii) a media gateway controller for intermediating communications between the media gateway and the signaling controller, and for translating communications between a packet data network and a PSTN. Details regarding a preferred, exemplary architecture of the gateway 420 are provided by another U.S. patent application Ser. No. 10/161,497, filed Jun. 3, 2002, entitled, naming the same inventors, and entitled "Method and System for Diverting Wireless Network Communications," which is fully incorporated herein by reference.

D. Mobile Station Arbitration Support for Voice Session Hand-off

Figure 5:
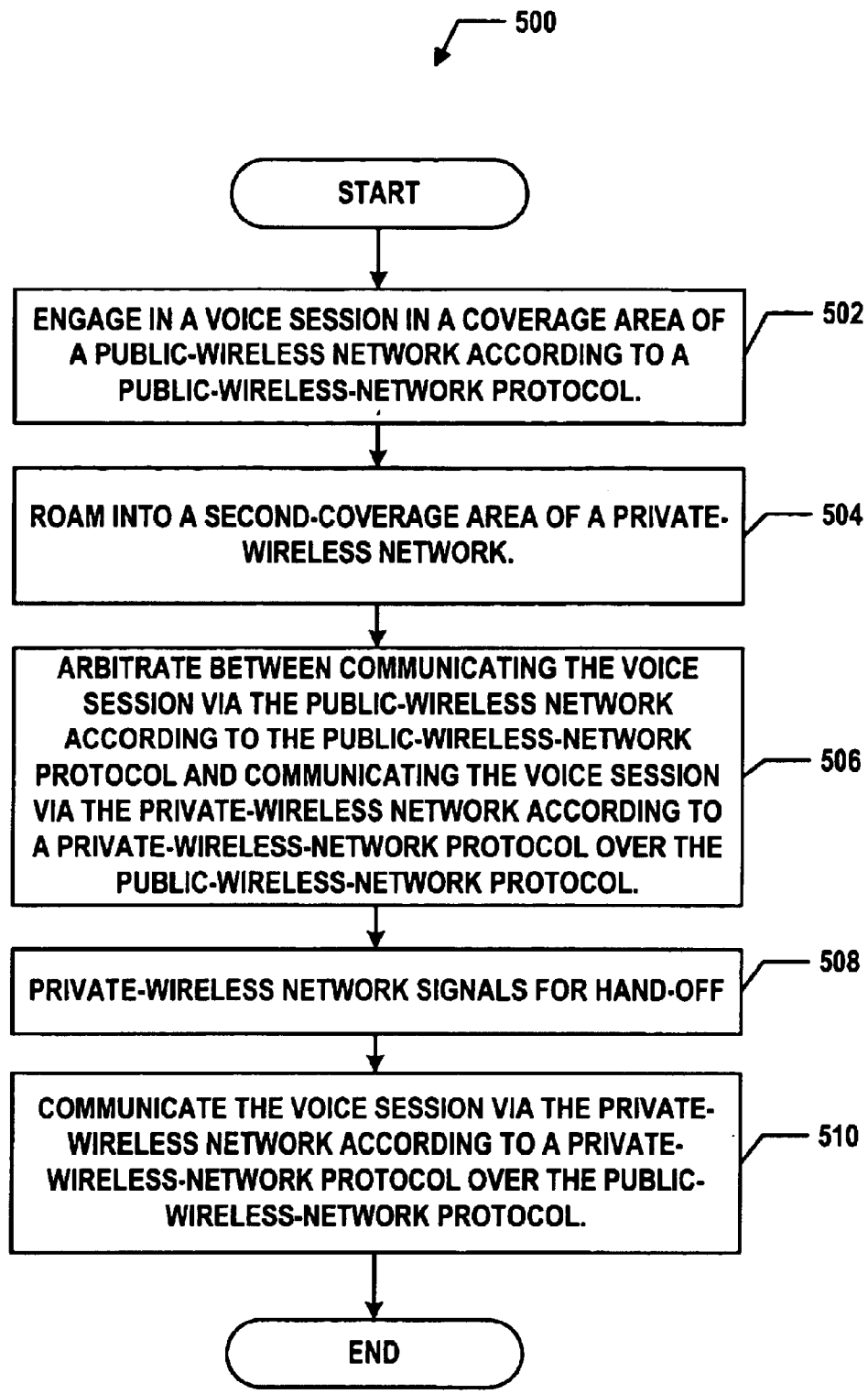
FIG. 5 is a flow chart illustrating the functions used to accomplish mobile station arbitration and voice session hand-off in accordance with one of the exemplary embodiment.

Referring next to FIG. 5, a flow chart 500 is provided for further illustrating the functions used to accomplish mobile station arbitration and voice session hand-off in accordance with an exemplary embodiment. The exemplary embodiment illustrated in FIG. 5 is described with reference to FIGS. 2, 3 and 4 in which the mobile station 116 engages in an ongoing voice session via the public wireless network 412. Sometime during the ongoing voice session the mobile station 116 moves into a location in which it can arbitrate between carrying the ongoing voice session according to a protocol of the public wireless network and carrying the ongoing voice session according to a protocol of the public wireless network over a protocol over the private wireless network. Based on one or more of the arbitration policies provisioned into the mobile station 116, the ongoing voice session is handed-off to the mobile station 116 then operating in the private wireless network 418. It should be understood that the particular order of functions as set forth and described herein can vary from that presented.

Further, in the example of FIG. 5, the format of the public wireless network 412 is CDMA, and the mobile station 116 communicates with the BTS 422 using the EVRC standard. And the format of the private wireless network complies with IEEE 802.11 WLAN protocol in which the mobile station 116 communicates with the wireless access point 424 using the IEEE 802.11 protocol. For illustration purposes, the transport network 414 comprises a PSTN. Moreover, it should be understood that the format of the public wireless network 412, the private wireless network 418 and the transport network 414 might differ from the formats described herein.

(i) Engaging in a Pre-hand-off Session

At block 502, the mobile station 116 engages in the ongoing voice session via the CDMA format public wireless network 412. Engaging in this ongoing voice session may be performed as follows. The mobile station 116, or more particularly, the CODEC module 316, using a PCM codec, encodes outgoing voice content received by the microphone 412 to produce outgoing-PCM voice content. Next, the VOCODER module 418 using an EVRC vocoder encodes outgoing-PCM voice content of the ongoing communication session. This encoding produces outgoing-EVRC voice content. Once encoded, the mobile station 116 transmits the outgoing-EVRC voice content to the BTS 422. The BTS 422 receives and relays the outgoing-EVRC voice content to the BSC 426. After receiving the outgoing-EVRC voice content, the BSC 436 may convert the outgoing-EVRC voice content into outgoing-PCM voice content using the ITU G.711 standard or some other transmission standard before transmitting it to the transport network 414, and in turn to the gateway 420.

For the downstream part of the ongoing voice session, upon receiving incoming-PCM voice content, the gateway 420 simply relays it to the public wireless network 412. If, on the other hand, the gateway 420 receives incoming voice content that is not PCM encoded, the gateway 420 may encode it to produce incoming-PCM voice content before sending it to the BSC 426. After receiving the incoming-PCM voice content, the BSC 426 may convert it to incoming-EVRC voice content before transmitting it to the mobile station 116 via the BTS 422.

(ii) Mobile Station Registering in the Private Wireless Network

During the ongoing voice session, as noted in block 504, the mobile station 116 roams, or otherwise moves into a location or a mode in which it can communicate the ongoing voice session according to the EVRC standard via the public wireless network 412 and/or according the IEEE 802.11 standard via the 802.11-format WLAN 418. When moving to this location, the mobile station 116 may establish link-layer or other lower layer protocol connectivity with the 802.11-format WLAN 418. In establishing link-layer connectivity, the mobile station 116, using its second-protocol transceiver 310, detects the presence of the 802.11-format WLAN 418 and begins to register.

Registering with the 802.11-format WLAN 418, in the simplest form, may include merely "associating" the mobile station 116 with the 802.11-format WLAN 418 via the wireless access point 424. Registering may also include "logging" into the 802.11-format WLAN 418, which may include providing a username and password. Further, registering with the 802.11-format WLAN 418 may include employing secure connection services such as IEEE 802.11 Wired Equivalency Privacy (WEP), security system identification (SSID), extensible authentication protocol (EAP) or other secure connection service.

The process of associating the mobile station 116 with the 802.11-format WLAN 418 may include one or more steps that occur during the ongoing communication session. Although described in more detail in the IEEE 802.11 protocol, an example of associating the mobile station 116 and WLAN is illustrated with the following three steps. First, the mobile station 116, using its second-protocol transceiver 310, senses the wireless medium, and if the medium is free (i.e. no other mobile station currently transmitting to the wireless access point 424), then the second-protocol transceiver 310 transmits a request for synchronization information from the wireless access point 424. If, however, the wireless medium is busy, the second-protocol transceiver 310 delays transmission for a period of time before re-requesting the synchronization information. Once the synchronization information is received, the second-protocol transceiver 310 adjusts as needed, and then synchronizes with the wireless access point 424.

Second, after the second-protocol transceiver 310 receives the synchronization information and synchronizes with wireless access point 424, the mobile station 116 then "authenticates" with the 802.11-format WLAN 418. To authenticate, the second-protocol transceiver 310 and the wireless access point 424 exchanges frames, or packet-data, containing their respective identities or addresses. The exchange of frames may eventually result in the mutual verification of identity. To continue with the process of association, the mobile station 116 and the wireless access point 424 mutually authenticate. If either the mobile station 116 or the wireless access point 424 do not mutually authenticate, then the wireless access point 424 de-authenticates or otherwise denies access to the mobile station 116.

Third, once authenticated, the second-protocol transceiver 310 sends an association request to the wireless access point 424, which may include sending an IEEE 802.11 or some other format packet-data address (802.11 address) of the mobile station 116. The association request may also include the 802.11 address of the wireless access point 424. In response to the association request, the wireless access point 424 sends to second-protocol transceiver 310 an association response, which contains either, a "successful" or "unsuccessful" association result. Upon "successful" association, the response includes an association identifier that notifies the mobile station 116 that the 802.11-format WLAN 418 has data ready to send to it. Once associated, the mobile station 116 is capable of transmitting and receiving communications with the 802.11-format WLAN 418.

In addition to the three steps noted above, when roaming or otherwise outside the coverage area of wireless access point 424, but within the coverage area of the 802.11-format WLAN 418, the process of association may include the mobile station 116 "re-associating" with the other wireless access points, with or without disassociating with wireless access point 424. Once re-associated, the WLAN subscriber's mobile station 116 is capable of communicating with the other wireless access points of the 802.11 format WLAN 418, and if still associated, with wireless access point 424 as well.

After registering with the 802.11-format WLAN 418, the mobile station 116 begins arbitration as shown in block 506. To facilitate arbitration, the mobile station 116 may detect performance characteristics of the CDMA-format public wireless network 412, and/or performance characteristics of the 802.11-format WLAN 418. In one exemplary embodiment, the mobile station 116 may receive from the CDMA-format public wireless network 412 over a signaling channel, such as CDMA Inter-Operability Specification (IOS) A1 channel, signals or signaling messages containing preferred-network metrics. These preferred-network metrics may contain performance measurements of the CDMA-format public wireless network 412 (hereinafter referred to as CDMA-network-performance metrics).

In addition, the mobile station 116 may receive from the 802.11-format WLAN 418 "signaling" messages contained within packetized voice content. These signaling messages, which may be separated from the packetized voice-content using logical channels, may contain preferred-network metrics, such as performance measurements of the 802.11-format WLAN 418 (hereinafter referred to as 802.11-network-performance metrics).

E. Mobile Station Arbitration Between Public and Private Wireless Networks

The mobile station 116, which may be provisioned to carry out the arbitration policies, may arbitrate, based on the at least one arbitration policy, between communicating voice content according to EVRC via the CDMA-format public wireless network 412 and communicating voice content according to the 802.11-framed-EVRC-encoded voice content via the 802.11-format WLAN 418. As noted above, the mobile station may receive user input to select the one or more arbitration policies for arbitration. For instance, the user may depress a sequence of keystrokes on the mobile station 116 to select desired arbitration policies. Alternatively, the user profile or subscription plan may dictate the arbitration policies.

In an exemplary embodiment, the mobile station 116 may perform the arbitration using a comparison function. This comparison function may be performed by first ascertaining one or more preferred-network metrics and then comparing the preferred-network metrics to one or more preferred-network thresholds. If the preferred-network metrics surpass the preferred-network threshold, then depending on the type of preferred-network threshold, the mobile station 116 may communicate voice content according to EVRC via the CDMA-format public wireless network 412 or may communicate voice content according to the 802.11-framed-EVRC-encoded voice content via the 802.11-format WLAN 418.

As one skilled in the art will recognize, the state of surpassing a preferred-network thresholds describes a relative condition may be defined by the threshold type, the value assigned to threshold and the direction a corresponding preferred-network metric approaches the preferred-network threshold. For instance, when the mobile station 116, which is engaging in a communication via the CDMA-format public wireless network 412, detects a signal level that is below (i.e., is less than) a minimum acceptable signal level defined by one of the preferred-network thresholds having a signal-strength threshold for the CDMA-format public wireless network 412, it may drop the communication. On the other hand, if the mobile station 116 is not yet engaging in a communication, but is attempting to connect, then once the detected signal level rises above (i.e., is greater than) the minimum acceptable signal level, the mobile station connects. Thus, in the former instance, surpassing the preferred-network threshold occurs when the detected signal falls below the minimum acceptable signal level. In the latter instance, surpassing the preferred-network threshold occurs when the detected signal rises above the minimum acceptable signal level. Therefore, surpassing the preferred-network threshold may include the mathematical functions of greater than, greater than and equal to, less than, less than and equal to, and equal to. The following examples illustrate the comparison function for a variety of preferred network attributes.

(i) EXAMPLE 1

Referring to back to FIGS. 3 and 4, the following illustrates the comparison function for mobile station arbitration based on the cost of service for the first-access network. As an initial condition, the mobile station 116 engages in a voice session according to EVRC via the CDMA-format public wireless network 412.

The mobile station 116 or more particularly, the first-protocol transceiver 308 embodied as a CDMA transceiver, receives from the CDMA-format public wireless network 412 over the IOS A1 channel a signaling message containing a cost of service metric or measurement for communicating the voice session via the CDMA-format public wireless network 412.

The mobile station 116, or more particularly the arbitration module 304, is provisioned with a preprogrammed cost-of-service threshold for the CDMA-format public wireless network 412. The mobile station 116, however, could receive from the CDMA-format public wireless network 412 the cost of service threshold extracted from a user's profile or other database record.

When the arbitration module 304 receives the cost-of-service metric (e.g., the cost for each unit of usage in terms of money) from the CDMA transceiver 308, it then performs a test or otherwise compares the cost-of-service metric for the CDMA-format public wireless network 412 against the cost-of-service threshold. If the cost-of-service metric surpasses (e.g. is less than) the cost-of-service threshold, then the arbitration module 304 will continue to route outgoing-EVRC voice content from the first-protocol speech coder/decoder 302, embodied as a PCM/EVRC coder/decoder, to the CDMA transceiver 308. When the arbitration module 304 allocates the mobile station's resources as such, incoming-EVRC voice content is likewise passed from the CDMA transceiver 308 to the PCM/EVRC coder decoder 302.

If, on the other hand, the cost-of-service metric does not surpass (e.g., is greater than or equal to) the cost-of-service threshold, the arbitration module 304 may continue to carry the ongoing voice session according to EVRC or alternatively, switch to engaging in the voice session via the 802.11-format WLAN 418 using 802.11-framed-EVRC-encoded voice content. Before switching, however, the mobile station 116 is likely to perform the comparison function again to compare a cost-of-service metric ascertained from 802.11-format WLAN 418 against the cost-of-service threshold for the 802.11-format WLAN 418.

If, after performing this comparison function again, the arbitration module 304 determines that the cost-of-service metric for the 802.11-format WLAN 418 does not surpass (e.g., is less than) the cost-of-service threshold for the 802.11-format WLAN 418, then it may forward outgoing-EVRC-encoded voice content to the encapsulation module 306. When received, the encapsulation module 306 encapsulates or "frames" the outgoing-EVRC-encoded voice content in IEEE 802.11 headers to produce outgoing-802.11-framed-EVRC-encoded voice content.

After encapsulation, the encapsulation module 306 sends to the second-protocol transceiver 310, which may be embodied as an IEEE 802.11 transceiver ("802.11 transceiver"), the outgoing-802.11-framed-EVRC-encoded voice content. The 802.11 transceiver 310 then transmits the outgoing-802.11-framed-EVRC-encoded voice content to the wireless-access point 424.

When the 802.11 transceiver 310 receives incoming-802.11-framed-EVRC-encoded voice content and the arbitration module 304 allocates the mobile stations resources to receive such content, the incoming-802.11-framed-EVRC-encoded voice content is sent to the encapsulation module 306. The encapsulation module 306 then strips the 802.11 frames from the incoming-EVRC-encoded voice content, which will eventually be delivered to the mobile station's user via the speaker 314.

While this example illustrates the comparison function for the cost-of-service thresholds and the cost-of service metrics for the CDMA-format public wireless network 412 and 802.11-format WLAN 418, respectively. The comparison function may be carried out for other preferred-network thresholds and metrics as well.

FIG. 6 is a first table (Table 1) illustrating a non-exhaustive list of instances of when the arbitration module 304 may allocate mobile station resources for communicating the voice session via the CDMA-format public wireless network 412 using the EVRC in accordance with an exemplary embodiment. Similar to FIG. 6, FIG. 7 is a second table (Table 2) illustrating a non-exhaustive list of instances of when the arbitration module 304 may allocate mobile station's resources for communicating the voice session via the 802.11-format WLAN 418 using the 802.11-framed-EVRC encoded voice content. Tables 1 and 2 provide only exemplary instances for arbitrating between the CDMA-format public wireless network and the 802.11-format WLAN. Other format networks may use different metrics and thresholds for the comparison function.

(ii) EXAMPLE 2

The following example illustrates the comparison function for mobile station arbitration using relative preferred-network metrics and relative preferred-network thresholds. As an initial condition, the mobile station 116 engages in a voice session according to EVRC via the CDMA-format public wireless network 412.

The CDMA transceiver 308 detects or otherwise measures the signal-strength of the CDMA-format public wireless network 412 using beacon signals, which the BTS 422 continuously transmits. In addition, the 802.11 transceiver 310 likewise detects or otherwise measures the signal-strength of the 802.11-format WLAN from the WLAN's beacon signals.

The arbitration module 304 is provisioned with a preprogrammed CDMA-signal-strength-scale factor for normalizing the signal-strength metric of the CDMA-format public wireless network 412 (i.e., causing the signal-strength metric to conform to a standard or norm) so as to produce CDMA-signal-strength metric. The arbitration module 304 may also be provisioned with a preprogrammed 802.11-signal-strength-scale factor for normalizing the signal-strength metric of the 802.11-format WLAN 418 so as to produce 802.11-signal-strength metric.

The mobile station 116, however, could receive the CDMA-signal-strength-scale factor from CDMA-format public wireless network 412. Similarly, the mobile station 116 could receive the 802.11-signal-strength-scale factor from the 802.11-format WLAN. In addition to the scale factors, the arbitration module 304 may be provisioned with a relative-signal-strength threshold. In an exemplary embodiment, this threshold may provide a limit at which the ratio of the CDMA-signal-strength metric to the 802.11-signal-strength metric is greater than one. The relative-signal-strength threshold may take other forms as well.

After normalization both of the signal-strength metrics, the arbitration module 304 divides the CDMA-signal-strength metric by the 802.11-signal-strength metric to produce a relative-signal strength metric. Then, the arbitration module 304 performs a test or otherwise compares relative-signal strength metric against the relative-signal-strength threshold. If, in this case, relative-signal-strength metric surpasses (e.g. is greater than) the relative-signal-strength threshold, then the arbitration module 304 will continue to route outgoing-EVRC voice content from the PCM/EVRC coder/decoder 302 to the CDMA transceiver 308. When the arbitration module 304 allocates the mobile station's resources as such, incoming-EVRC voice content is likewise passed from the CDMA transceiver 308 to the PCM/EVRC coder decoder 302.

If, on the other hand, the relative-signal-strength metric does not surpass (e.g., is less than or equal to) the relative-signal-strength threshold, the arbitration module 304 may switch to engaging in the voice session via the 802.11-format WLAN 418 using 802.11-framed-EVRC-encoded voice content as noted in example 1 above. While this example illustrates the comparison function for the relative-signal strength threshold and the relative-signal-strength metric for the CDMA-format public wireless network 412 and 802.11-format WLAN 418, the comparison function may be carried out for other preferred-network thresholds and metrics as well.

FIG. 8 illustrates a third table (Table 3) containing a non-exhaustive list of instances of other relative-preferred metrics and thresholds in accordance with an exemplary embodiment. Table 3 provides only an exemplary listing for arbitrating between the CDMA-format public wireless network and the 802.11-format WLAN using relative-preferred metrics and thresholds. And other format networks may use different metrics and thresholds for the comparison function.

F. Signaling for Hand-off to the Private Wireless Network

After the arbitration module 304 allocates the mobile station's resources to carry the ongoing voice session via the 802.11-format WLAN 418 and after establishing link-layer connectivity, the 802-11-format WLAN 418 signals the gateway 420 with instructions to route incoming-EVRC-encoded voice content and/or other similarly encoded voice content to the mobile station 116 via the WLAN, as shown in block 508. The process of the 802-11-format WLAN signaling the gateway 420 may include the WLAN server 432 exchanging messages with the gateway 420 using an appropriate protocol, such as the simple mail transfer protocol (SMTP), the hypertext transfer protocol (HTTP), the file transfer protocol (FTP), the file service protocol (FSP), the session initiation protocol (SIP), the media gateway control protocol (MGCP), and/or some other protocol. Included within the exchanged messages are the instructions to route the incoming EVRC voice content to the mobile station 116. For more information on an exemplary signaling, see the pending non-provisional application Ser. No. 10/161,313, filed Jun. 3, 2002, titled "Method And System For Intersystem Wireless Communication Session Hand-Off," which is assigned to the same assignee as the present application.

G. Handing-off

At some time after the arbitration module 304 allocates the mobile station's resources to carry the ongoing voice session via the 802.11-format WLAN 418, the gateway 420 receives the instructions to route the incoming-EVRC voice content to the mobile station 116. If, after receiving instructions or signaling to route the incoming-EVRC voice content to the 802.11-format WLAN 418, the gateway 420 receives incoming data that does not conform to the EVRC standard, it may preferably encode the incoming voice content according to EVRC. While EVRC is a preferred encoding standard, which is used in the public wireless system 412, other public wireless network encoding protocol/standards can likewise be used by the public wireless system 412.

As shown in block 510, the mobile station 116 then carries the ongoing voice session via the 802.11-format WLAN using 802.11-framed-EVRC-encoded voice content. To facilitate the hand-off, the gateway 420 encapsulates the incoming-EVRC-encoded voice content in one or more IEEE 802.11 frames (802.11 frame) to produce incoming 802.11-framed-EVRC-encoded voice content. The gateway 420 then sends the incoming-802.11-framed-EVRC-encoded voice content to the WLAN Server 432, using the appropriate connection or connectionless oriented transfer mechanism, which may include using a UDP/IP link. The incoming-802.11-framed-EVRC-encoded voice content may be sent using other transmission protocols, as well.

After arrival, the WLAN Server 432 may relay the incoming-802.11-framed-EVRC-encoded voice content to the wireless access point 424. The wireless access point 424, in turn, transmits the incoming-802.11-framed-EVRC-encoded voice content to the mobile station 116.

The mobile station 116 receives the incoming-802.11-framed-EVRC-encoded voice content and using its encapsulation module 306 unencapsulated or uncovers the incoming-EVRC-encoded voice content from the incoming-802.11-framed-EVRC-encoded voice content. Upon receipt, the mobile station 116, using its arbitration module 304, delivers the incoming 802.11-framed-EVRC-encoded voice content to the recipient using its EVRC/PCM coder/decoder 302.

For the portion of the ongoing voice session emanating from the mobile station 116, the mobile station 116 uses the EVRC/PCM coder/decoder 302 to create outgoing-EVRC-encoded data. The mobile station 116 processes the outgoing-EVRC-encoded voice content through the arbitration module 304 to the encapsulation module 306. The encapsulation module 306 then encapsulates the outgoing-EVRC-encoded voice content in one or more 802.11 frames. Upon receiving the outgoing-802.11-framed-EVRC-encoded voice content, the wireless access point 424 may send it to the WLAN server 432 un-translated. Alternatively, the wireless access point 424 may remove the 802.11 frames from the outgoing-802.11-framed-EVRC-encoded voice content, and then encapsulate it according to a protocol for transmission to the WLAN server 432, the transport network 414, the gateway 420, or any other upstream element.

After receiving the outgoing-802.11-framed-EVRC-encoded voice content, the WLAN server 432 may relay it to the gateway 432 via the PDN 430. Alternatively, the WLAN server 432 may strip the outgoing-EVRC-encoded voice content from the outgoing-802.11-framed-EVRC-encoded voice content. And before sending the outgoing-EVRC-encoded voice content to the gateway 420, the WLAN server 432 may convert or translate it into outgoing-PCM encoded data according to an intersystem protocol, such as ITU G.711, for transmission to the gateway 432.

The WLAN server 432 may send the outgoing-802.11-framed-EVRC-encoded voice content to the gateway 420 using a UDP/IP link or other transport protocol. After traveling through the PDN 430, the outgoing-802.11-framed-EVRC-encoded voice content arrives at the gateway 420, whereupon the outgoing-EVRC-encoded voice content is stripped from the outgoing-802.11-framed-EVRC-encoded voice content by the gateway 420. The gateway 420 then routes the outgoing-EVRC-encoded voice content to the transport network 414 for transmission to the recipient. As another option, the gateway 420 may translate the outgoing-EVRC-encoded voice content into outgoing-PCM voice content before routing it to the transport network 414.

7. Hand-off from Second to First Access System

In the mobile station arbitration and communication session hand-off embodiments previously discussed, the mobile station initially carried the ongoing communication via a first access system using its first-protocol mode. Then, sometime during the ongoing communication the mobile station moved to a given location at which it could carry the ongoing communication via the first access system using its first-protocol mode and/or carry the ongoing communication via the second-access system using its second-protocol mode. After registration, arbitration and hand-off, the mobile station communicated the ongoing session via the second-access network using its second-over-first-protocol mode.

Mobile station arbitration and communication session hand-off may be similarly carried out when the mobile station initially engages in an ongoing communication via the second-access network using its second-over-first protocol mode and then moves to the given location. After registration, arbitration and hand-off to the second-access system, the mobile station may communicate the ongoing session via the first-access network using its first-protocol mode. As one skilled in the art will recognize, such registration, arbitration and hand-off may be effectuated without substantial variation using the exemplary architecture and processes discussed above.

8. Conclusion

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

In addition, the media type discussed in conjunction with the mobile station arbitration and hand-off was voice content. As one skilled in the art will recognize, this type of real-time media may require low latency between the mobile station and the other-end recipient for communication and/or hand-off between access systems. In general, the upper threshold for human tolerance appears to be 300 milliseconds delay one way between one wireless access system to another and 120 milliseconds delay one way from a wireless access system to a land line telephone.

Other real-time media may also be used with the method and system discussed above. An example of these other real-time media include streaming video on a network-connected device or mobile station using streaming technology such as Microsoft's NetShow or Real Audio's Real player. Like the voice session, mobile station arbitration and hand-off of a real-time media session allows the user to continue to watch the same stream uninterrupted or slightly interrupted as the mobile station moves to another access technology.

Moreover, the claims should not be read as limited to the described embodiments, order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A method comprising:
   (a) a mobile station operating at a given location at which the mobile station can communicate according to a first protocol via a first-access system and at which the mobile station can communicate according to a wireless-local-area-network (WLAN) protocol via a second-access system; and
   (b) while the mobile station is operating at the given location, the mobile station arbitrating between communicating voice content according to the first protocol via the first-access system and communicating voice content according to the WLAN protocol encapsulating the first protocol via the second-access system.

2. The method of claim 1, further comprising:
   the mobile station communicating voice content according to the first-protocol in a coverage area of the first-access system;
   making a determination that the mobile station has moved to the given location; and
   performing element (b) in response to the determination that the mobile station has moved into the given location.

3. The method of claim 2, further comprising:
   making a determination that the mobile station has moved from the given location; and
   ceasing to perform element (b) in response to the determination that the mobile station has moved from the given location.

4. The method of claim 2, wherein the mobile station makes the determination that it has moved to the given location.

5. The method of claim 1, further comprising:
the mobile station communicating voice content according to the wireless-local-area-network protocol in a coverage area of the second-access system;
making a determination that the mobile station has moved to the given location; and
performing element (b) in response to the determination that the mobile station has moved into the given location.

6. The method of claim 5, further comprising:
making a determination that the mobile station has moved from the given location; and
ceasing to perform element (b) in response to the determination that the mobile station has moved from the given location.

7. The method of claim 5, wherein the mobile station makes the determination that it has moved to the given location.

8. The method of claim 1, further comprising:
the mobile station communicating voice content according to the wireless-local-area-network protocol encapsulating the first protocol in a coverage area of the second-access system;
determining that the mobile station has moved to the given location; and
performing element (b) in response to the determination that the mobile station has moved into the given location.

9. The method of claim 8, further comprising:
making a determination that the mobile station has moved from the given location; and
ceasing to perform element (b) in response to the determination that the mobile station has moved from the given location.

10. The method of claim 8, wherein the mobile station makes the determination that it has moved to the given location.

11. The method of claim 1, wherein the mobile station is provisioned to carry out at least one arbitration policy, and wherein element (b) comprises,
the mobile station arbitrating between communicating voice content according to the first protocol via the first-access system and communicating voice content according to the wireless-local-area-network protocol encapsulating the first protocol via the second-access system based on the at least one arbitration policy.

12. The method of claim 11, further comprising the mobile station receiving user input (e.g., selection) to define the at least one arbitration policy.

13. The method of claim 11, wherein the at least one arbitration policy comprises an attribute selected from the group consisting of class-of-service attributes, quality-of-service attributes, and preferred-network attributes.

14. The method of claim 11, wherein the at least one arbitration policy comprises a preferred-network threshold, and wherein the mobile station arbitrating between communicating voice content according to the first protocol via the first-access system and communicating voice content according to the wireless-local-area-network protocol encapsulating the first protocol via the second-access system based on the at least one arbitration policy comprises a comparison function that comprises:
ascertaining a preferred-network metric; and
communicating voice content according to the first protocol via the first-access system when the preferred-network metric surpasses the preferred-network threshold.

15. The method of claim 14, wherein the ascertaining a preferred-network metric comprises the mobile station receiving from the first-access system a preferred-network metric.

16. The method of claim 14, wherein the ascertaining a preferred-network metric comprises the mobile station receiving from the second-access system a preferred-network metric.

17. The method of claim 14, wherein the comparison function is selected from the group consisting of:
(i) ascertaining a first-cost-of-service metric for the first-access system and responsively communicating voice content according to the first protocol via the first-access system when the first-cost-of-service metric surpasses a first-cost-of service threshold;
(ii) ascertaining a first-transmission-rate metric for the first-access system and responsively communicating voice content according to the first protocol via the first-access system when the first-transmission-rate metric surpasses a first-transmission-rate threshold;
(iii) ascertaining a first-security metric for the first-access system and responsively communicating voice content according to the first protocol via the first-access system when the first-security metric surpasses a first-security threshold;
(iv) ascertaining a first-traffic-volume metric for the first-access system and responsively communicating voice content according to the first protocol via the first-access system when the first-traffic-volume metric surpasses a first-traffic-load threshold;
(v) ascertaining a first-signal-strength metric for the fist-access system and responsively communicating voice content according to the first protocol via the first-access system when the first-signal-strength metric surpasses a first-signal-strength threshold;
(vi) ascertaining a second-cost-of-service metric for the second-access system and responsively communicating voice content according to the first protocol via the first-access system when the second-cost-of-service metric surpasses a second-cost-of service threshold;
(vii) ascertaining a second-transmission-rate metric for the second-access system and responsively communicating voice content according to the first protocol via the first-access system when the second-transmission-rate metric surpasses a second-transmission-rate threshold;
(viii) ascertaining a second-security metric for the second-access system and responsively communicating voice content according to the first protocol via the first-access system when the second-security metric surpasses a second-security threshold;
(ix) ascertaining a second-traffic-volume metric for the second-access system and responsively communicating voice content according to the first protocol via the first-access system when the second-traffic-volume metric surpasses a second-traffic-load threshold; and
(x) ascertaining a second-signal-strength metric for the second-access system and responsively communicating voice content according to the first protocol via the first-access system when the second-signal-strength metric surpasses a second-signal-strength threshold.

18. The method of claim 11, wherein the at least one arbitration policy comprises a preferred-network threshold, and wherein the mobile station arbitrating between communicating voice content according to the first protocol via the first-access system and communicating voice content according to the wireless-local-area-network (WLAN) protocol encapsulating the first protocol via the second-access system based on the at least one arbitration policy comprises a comparison function that comprises:

ascertaining a preferred-network metric; and communicating voice content according to the WLAN protocol encapsulating the first protocol via the second-access system when the preferred-network metric does not surpass the preferred-network threshold.

19. The method of claim 18, wherein ascertaining a preferred-network metric comprises the mobile station receiving from the first-access system a preferred-network metric.

20. The method of claim 18, wherein the ascertaining a preferred-network metric comprises the mobile station receiving from the second-access system a preferred-network metric.

21. The method of claim 18, wherein the comparison function is selected from the group consisting of:

(i) ascertaining a first-cost-of-service metric for the first-access system and responsively communicating voice content according to the wireless-local-area-network (WLAN) protocol encapsulating the first protocol via the second-access system when the first-cost-of-service metric does not surpass a first-cost-of service threshold;

(ii) ascertaining a first-transmission-rate metric for the first-access system and responsively communicating voice content according to the WLAN protocol encapsulating the first protocol via the second-access system when the first-transmission-rate metric does not surpass a first-transmission-rate threshold, (iii) ascertaining a first-security metric for the first-access system and responsively communicating voice content according to the WLAN protocol encapsulating the first protocol via the second-access system when the first-security metric does not surpass a first-security threshold;

(iv) ascertaining a first-traffic-volume metric for the first-access system and responsively communicating voice content according to the WLAN protocol encapsulating the first protocol via the second-access system when the first-traffic-volume metric does not surpass a first-traffic-load threshold;

(v) ascertaining a first-signal-strength metric for the first-access system and responsively communicating voice content according to the WLAN protocol encapsulating the first protocol via the second-access system when the first-signal-strength metric does not surpass a first-signal-strength threshold;

(vi) ascertaining a second-cost-of-service metric for the second-access system and responsively communicating voice content according to the WLAN protocol encapsulating the first protocol via the second-access system when the second-cost-of-service metric does not surpass a second-cost-of service threshold;

(vii) ascertaining a second-transmission-rate metric for the second-access system and responsively communicating voice content according to the WLAN protocol encapsulating the first protocol via the second-access system when the second-transmission-rate metric does not surpass a second-transmission-rate threshold;

(viii) ascertaining a second-security metric for the second-access system and responsively communicating voice content according to the WLAN protocol encapsulating the first protocol via the second-access system when the second-security metric does not surpass a second-security threshold;

(ix) ascertaining a second-traffic-volume metric for the second-access system and responsively communicating voice content according to the WLAN protocol encapsulating the first protocol via the second-access system when the second-system-traffic-volume metric does not surpass a second-traffic-load threshold; and (x) ascertaining a second-signal-strength metric for the second-access system and responsively communicating voice content according to the WLAN protocol encapsulating the first protocol via the second-access system when the second-signal-strength metric does not surpass a second-signal-strength threshold.

22. The method of claim 11, wherein the at least one arbitration policy comprises a preferred-network threshold, and wherein the mobile station arbitrating between communicating voice content according to the first protocol via the first-access system and communicating voice content according to the wireless-local-area-network (WLAN) protocol encapsulating the first protocol via the second-access system based on the at least one arbitration policy comprises a comparison function that comprises:

ascertaining a first-preferred-network metric;

ascertaining a second-preferred-network metric;

comparing the first-preferred-network metric to the second-preferred-network metric so as to produce a relative-preferred-network metric;

communicating voice content according to the first protocol via the first-access system when the relative-preferred-network metric surpasses the preferred-network threshold; and communicating voice content according to the WLAN protocol encapsulating the first protocol via the second-access system when the relative-preferred-network metric does not surpass the preferred-network threshold.

23. The method of claim 22, wherein the ascertaining a first-preferred-network metric comprises the mobile station receiving from the first-access system a preferred network metric.

24. The method of claim 22, wherein the ascertaining a second-preferred-network metric comprises the mobile station receiving from the second-access system a preferred-network metric.

25. The method of claim 22, wherein the comparison function is selected from the group consisting of:

(i) ascertaining a first-cost-of-service metric for the first-access system, ascertaining a second-cost-of-service metric for the second access system, comparing the first-cost-of-service metric to the second-cost-of-service metric so as to produce a relative-cost-of-service metric, communicating voice content according to the fist protocol via the first-access system when the relative-cost-of-service metric surpasses a relative-cost-of service threshold, and communicating voice content according to the wireless-local-area-network (WLAN) protocol encapsulating the first protocol via the second-access system when the relative-cost-of-service metric does not surpass the relative-cost-of service threshold;

(ii) ascertaining a first-transmission-rate metric for the first-access system, ascertaining a second-transmission-rate metric for the second access system, comparing the first-transmission-rate metric to the second-transmission-rate metric so as to produce a relative-transmission-rate metric, communicating voice content according to the first protocol via the first-access system when the relative-transmission-rate metric surpasses a relative-transmission-rate threshold, and communicating voice content according to the WLAN protocol encapsulating the first protocol via the second-access system when the relative-transmission-rate metric does not surpass the relative-transmission-rate threshold;

(iii) ascertaining a first-security metric for the first-access system, ascertaining a second-security metric for the second access system, comparing the first-security metric to the second-security metric so as to produce a relative-security metric, communicating voice content according to the first protocol via the first-access system when the relative-security metric surpasses a relative-security threshold, and communicating voice content according to the WLAN protocol encapsulating the first protocol via the second-access system when the relative-security metric does not surpass the relative-security threshold;

(iv) ascertaining a first-traffic-volume metric for the first-access system, ascertaining a second-traffic-volume metric for the second access system, comparing the first-traffic-volume metric to the second-traffic-volume metric so as to produce a relative-traffic-volume metric, communicating voice content according to the first protocol via the first-access system when the relative-traffic-volume metric surpasses a load-balancing threshold, and communicating voice content according to the WLAN protocol encapsulating the first protocol via the second-access system when the relative-traffic-volume metric does not surpass the load-balance threshold;

(v) ascertaining a first-signal-strength metric for the first-access system, ascertaining a second-signal-strength for the second access system, comparing the first-signal-strength metric to the second-signal-strength metric so as to produce a relative-signal-strength metric, communicating voice content according to the first protocol via the first-access system when the relative-signal-strength metric surpasses a relative-signal-strength threshold, and communicating voice content according to the WLAN protocol encapsulating the first protocol via the second-access system when the relative-signal-strength metric does not surpass the relative-signal-strength threshold.

26. A mobile station comprising at least one logic module having logic to:

(a) operate at a given location at which the mobile station can communicate according to a first protocol via a first-access system and at which the mobile station can communicate according to a wireless-local-area-network (WLAN) protocol via a second-access system; and (b) arbitrate between communicating voice content according to the first protocol via the first-access system and communicating voice content according to the WLAN protocol encapsulating the first protocol via the second-access system when the mobile station is at the given location.

27. The mobile station of claim 26, wherein the logic module further comprises logic to:

communicate voice content according to the first-protocol in a coverage area of the first-access system;

determine that the mobile station has moved to the given location; and perform element (b) in response to the determination that the mobile station has moved into the given location.

28. The method of claim 26, wherein the mobile station is provisioned to carry out at least one arbitration policy, and wherein element (b) comprises:

arbitrating between communicating voice content according to the first protocol via the first-access system and communicating voice content according to the wireless-local-area-network protocol encapsulating the first protocol via the second-access system based on the at least one arbitration policy.

29. The mobile station of claim 26, wherein the at least one logic module comprises:

a first-logic module for coding/decoding the voice content according to the first protocol so as to produce first-protocol encoded/decoded voice content;

a second-logic module for communicating the first-protocol encoded/decoded voice content via the first-access system;

a third-logic module for encapsulating first-protocol encoded/decoded voice content in headers of the wireless-local-area-network (WLAN) protocol so as to produce second-protocol-encapsulated-first-protocol encoded/decoded voice content;

a fourth-logic module for communicating the WLAN-protocol-encapsulated-first-protocol encoded/decoded voice content; and a fifth-logic module for arbitrating between the second logic module and the fourth logic module.

30. The mobile station of claim 29, wherein the first-logic module is an air-interface coder/decoder module for a first wireless network.

the second-logic module is an air interface transceiver module for the first wireless network;

the third-logic module is a wireless-local-area-network-protocol-encapsulating module for a second wireless network; and the fourth-logic module is an air interface transceiver module for the second wireless network.

31. The mobile station of claim 29, wherein the the first-logic module comprises a coder/decoder selected from the group consisting of an enhanced variable rate coder, Adaptive Code-Excited Linear Predictive coder/decoder, Code-Division-Multiple-Access (CDMA) Qualcomm Code-Excited Linear Predictive coder/decoder, a Selective Mode Vocoder coder/decoder, CDMA4000-SMV coder/decoder, and an Adaptive Multirate Global-System-for-Mobile-Communications (GSM) coder/decoder;

the second-logic module comprises a transceiver selected from the group consisting of a CDMA transceiver, a Time-Division-Multiple-Access transceiver, a Wideband-CDMA transceiver, a CDMA2000 transceiver, GSM transceiver;

the third-logic module comprises an encapsulating module selected from the group consisting of an Internet Protocol encapsulating module, an X.25 encapsulating module, a Frame Relay encapsulating module, Generic Routing Encapsulating module and a Signaling System 7 encapsulating module; and the fourth-logic module comprises a transceiver selected from the group consisting of an IEEE 802.11 transceiver, and a Bluetooth transceiver.

32. A method comprising:

(a) a mobile station operating at a given location at which the mobile station can communicate according to a first protocol via a first-access system and at which the mobile station can communicate according to a wireless-local-area-network (WLAN) protocol via a second-access system; and (b) while the mobile station is operating at the given location, the mobile station arbitrating between communicating real-time media according to the first protocol via the first-access system and communicating real-time media according to the WLAN protocol encapsulating the first protocol via the second-access system.

33. The method of claim 32, further comprising:

the mobile station communicating real-time media according to the first-protocol in a coverage area of the first-access system;

making a determination that the mobile station has moved to the given location; and performing element (b) in response to the determination that the mobile station has moved into the given location.

34. The method of claim 33, further comprising:

making a determination that the mobile station has moved from the given location; and ceasing to perform element (b) in response to the determination that the mobile station has moved from the given location.

35. The method of claim 32, further comprising:

the mobile station communicating voice content according to the wireless-local-area-network protocol encapsulating the first protocol in a coverage area of the second-access system;

making a determination that the mobile station has moved to the given location; and performing element (b) in response to the determination that the mobile station has moved into the given location.

36. The method of claim 35, further comprising:

making a determination that the mobile station has moved from the given location; and ceasing to perform element (b) in response to the determination that the mobile station has moved from the given location.

37. The method of claim 32, wherein the at least one arbitration policy comprises a preferred-network threshold, and wherein the mobile station arbitrating between communicating real-time media according to the first protocol via the first-access system and communicating real-time media according to the wireless-local-area-network (WLAN) protocol encapsulating the first protocol via the second-access system based on the at least one arbitration policy comprises a comparison function that comprises:

ascertaining a first-preferred-network metric;

ascertaining a second-preferred-network metric;

comparing the first-preferred-network metric to the second-preferred-network metric so as to produce a relative-preferred-network metric;

communicating real-time media according to the first protocol via the first-access system when the relative-preferred-network metric surpasses the preferred-network threshold; and communicating real-time media according to the WLAN protocol encapsulating the first protocol via the second-access system when the relative-preferred-network metric does not surpass the preferred-network threshold.

38. The method of claim 1, wherein the wireless-local-area-network protocol comprises a protocol for carrying out communications in an unlicensed radio frequency spectrum.

39. The mobile station of claim 26, wherein the wireless-local-area-network protocol comprises a protocol for carrying out communications in an unlicensed radio frequency spectrum.

40. The method of claim 32, wherein the wireless-local-area-network protocol comprises a protocol for carrying out communications in an unlicensed radio frequency spectrum.

* * * * *